(12) United States Patent
Orita et al.

(10) Patent No.: US 12,449,579 B2
(45) Date of Patent: Oct. 21, 2025

(54) OPTICAL FILTER

(71) Applicant: AGC Inc., Tokyo (JP)

(72) Inventors: Yuichiro Orita, Fukushima (JP); Kazuhiko Shiono, Fukushima (JP); Takashi Nagata, Shizuoka (JP)

(73) Assignee: AGC Inc., Tokyo (JP)

( * ) Notice: Subject to any disclaimer, the term of this patent is extended or adjusted under 35 U.S.C. 154(b) by 399 days.

(21) Appl. No.: 18/185,511

(22) Filed: Mar. 17, 2023

(65) Prior Publication Data

US 2023/0266513 A1 Aug. 24, 2023

Related U.S. Application Data

(63) Continuation of application No. PCT/JP2021/036719, filed on Oct. 4, 2021.

(30) Foreign Application Priority Data

Oct. 9, 2020 (JP) .................. 2020-171326

(51) Int. Cl.
*G02B 5/22* (2006.01)
*G02B 5/28* (2006.01)

(52) U.S. Cl.
CPC ............. *G02B 5/223* (2013.01); *G02B 5/281* (2013.01)

(58) Field of Classification Search
CPC .......... G02B 5/223; G02B 5/281; G02B 5/20; G02B 5/208; G02B 5/22; G02B 5/26; G02B 5/28; B32B 7/023; B32B 27/32
See application file for complete search history.

(56) References Cited

U.S. PATENT DOCUMENTS

| 9,041,885 B2* | 5/2015 | Weber ............... G02F 1/133553 349/113 |
| 2003/0035972 A1* | 2/2003 | Hanson ................... B32B 7/023 428/912.2 |
| 2016/0170105 A1* | 6/2016 | Nagaya ................. H10F 39/806 359/885 |
| 2019/0219749 A1* | 7/2019 | Shimmo .................. G02B 5/28 |
| 2020/0158930 A1* | 5/2020 | Kubo ....................... G02B 5/22 |

FOREIGN PATENT DOCUMENTS

| JP | 2016-200771 A | 12/2016 |
| JP | 2019-124946 A | 7/2019 |
| JP | 2020-34701 A | 3/2020 |

OTHER PUBLICATIONS

International Search Report issued Nov. 9, 2021 in PCT/JP2021/036719 filed on Oct. 4, 2021.

* cited by examiner

*Primary Examiner* — Balram T Parbadia
(74) *Attorney, Agent, or Firm* — Oblon, McClelland, Maier & Neustadt, L.L.P.

(57) ABSTRACT

An optical filter including: a substrate; and a dielectric multilayer film laid on or above at least one major surface of the substrate as an outermost layer, in which the substrate includes a resin film including a dye (I) having a maximum absorption wavelength in a wavelength of 690 to 900 nm in dichloromethane, and a resin, the optical filter transmits visible light and light in at least part of a wavelength of 900 to 1,000 nm, and the optical filter satisfies specific spectroscopic characteristics.

11 Claims, 4 Drawing Sheets

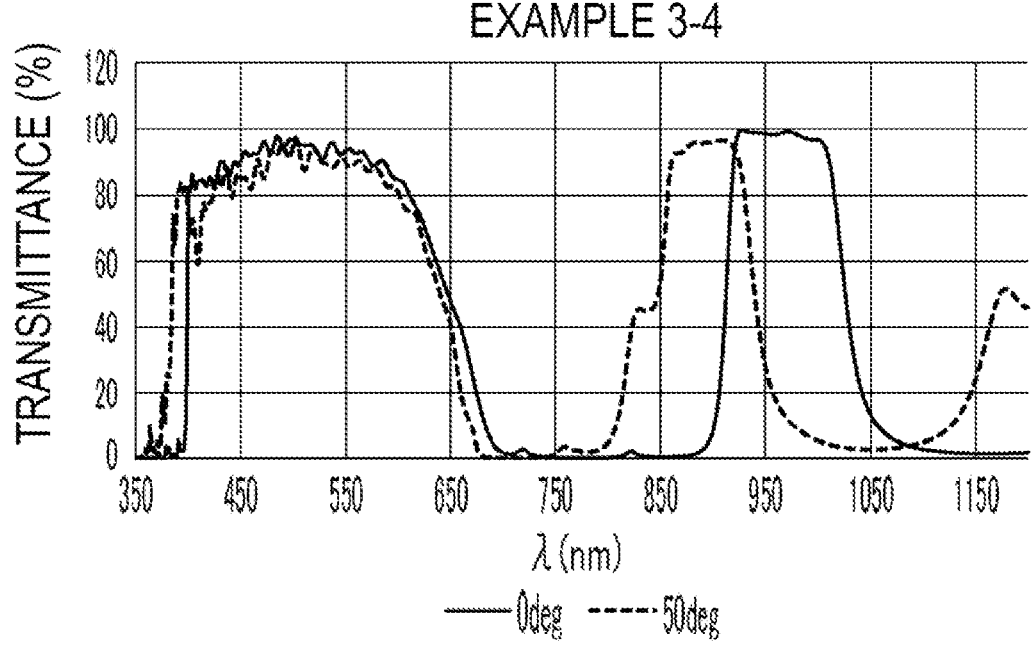

OPTICAL FILTER

CROSS-REFERENCE TO RELATED APPLICATIONS

This is a bypass continuation of International Patent Application No. PCT/JP2021/036719, filed on Oct. 4, 2021, which claims priority to Japanese Patent Application No. 2020-171326, filed on Oct. 9, 2020. The contents of these applications are hereby incorporated by reference in their entireties.

TECHNICAL FIELD

The present invention relates to an optical filter that transmits visible light and particular near-infrared light and blocks light in a wavelength range between the wavelength ranges of these kinds of light.

BACKGROUND ART

The uses of imaging apparatus that use a solid-state imaging device are expanding from surveillance cameras, vehicular cameras, etc. to apparatus that perform imaging both night and day. Such apparatus are required to acquire a (color) image on the basis of visible light and also acquire a (black-and-white) image on the basis of infrared light.

Thus, the use of an optical filter having a function of transmitting particular near-infrared light selectively in addition to a near-infrared cutting filter function for transmitting such visible light to enable faithful reproduction of an image on the basis of the visible light, that is, what is called a dual bandpass filter, is now being studied (Patent Literatures 1 and 2).
Patent Literature 1: JP2016-200771A
Patent Literature 2: JP2019-124946A

SUMMARY OF INVENTION

However, the optical filters disclosed in Patent Literatures 1 and 2 do not transmit near-infrared light whose wavelength is longer than 900 nm though they selectively transmit visible light and near-infrared light in a wavelength of 800 to 900 nm.

In recent years, sensors for sensing movement of a human body or eyes use laser light in a wavelength of around 950 nm. Accordingly, an optical filter is demanded capable of transmitting part of near-infrared light in a wavelength of 900 nm or longer, and blocking the other near-infrared light that provides noise.

An object of the present invention is to provide an optical filter that exhibits high transparency for visible light and particular near-infrared light and can block near-infrared light in the other wavelength ranges.

The invention provides an optical filter having the following configuration:

[1] An optical filter including:
a substrate; and
a dielectric multilayer film laid on or above at least one major surface of the substrate as an outermost layer, in which
the substrate includes a resin film including a dye (I) having a maximum absorption wavelength in a wavelength of 690 to 900 nm in dichloromethane, and a resin,
the optical filter transmits visible light and light in at least part of a wavelength of 900 to 1,000 nm and the optical filter satisfies all of the following spectroscopic characteristics (i-1) to (i-6):

(i-1) a maximum transmittance $T_{700\text{-}900(0deg)MAX}$ in a spectral transmittance curve in a wavelength of 700 to 900 nm at an incident angle of 0° is 7% or lower;
(i-2) a maximum transmittance $T_{700\text{-}850(50deg)MAX}$ in a spectral transmittance curve in a wavelength of 700 to 850 nm at an incident angle of 50° is 5% or lower;
(i-3) $IR70_{900\text{-}950(0deg)} - IR10_{900\text{-}950(0deg)}$ is 20 nm or smaller, where the $IR10_{900\text{-}950(0deg)}$ and the $IR70_{900\text{-}950(0deg)}$ are shortest wavelengths at which transmittances are 10% and 70%, respectively, in a spectral transmittance curve in a wavelength of 900 to 950 nm at an incident angle of 0°;
(i-4) $IR70_{850\text{-}930(50deg)} - IR10_{850\text{-}930(50deg)}$ is 50 nm or smaller, where the $IR10_{850\text{-}930(50deg)}$ and the $IR70_{850\text{-}930(50deg)}$ are shortest wavelengths at which transmittances are 10% and 70%, respectively, in a spectral transmittance curve in a wavelength of 850 to 930 nm at an incident angle of 50°;
(i-5) an absolute value of a difference between $IR50_{850(0deg)}$ and $IR50_{850(50deg)}$ is 30 nm or smaller, where the $IR50_{850(0deg)}$ and the $IR50_{850(50deg)}$ are shortest wavelengths at which transmittances are 50% in a spectral transmittance curve in a wavelength of 850 nm or longer at incident angles of 0° and 50°, respectively; and
(i-6) an average transmittance $T_{450\text{-}600(0deg)AVE}$ in a spectral transmittance curve in a wavelength of 450 to 600 nm at an incident angle of 0° is 60% or higher.

The invention can provide an optical filter that exhibits high transparency for visible light and particular near-infrared light, in particular, near-infrared light in a wavelength of 900 to 1,000 nm, exhibits a high near-infrared light blocking ability in the other wavelength ranges, in particular, 700 to 900 nm, and is suppressed in the reduction of a near-infrared light blocking ability at large incident angles.

BRIEF DESCRIPTION OF DRAWINGS

FIG. 7 is a graph showing a spectral transmittance curve of an optical filter of Example 3-4.

DESCRIPTION OF EMBODIMENT

Figure 1:
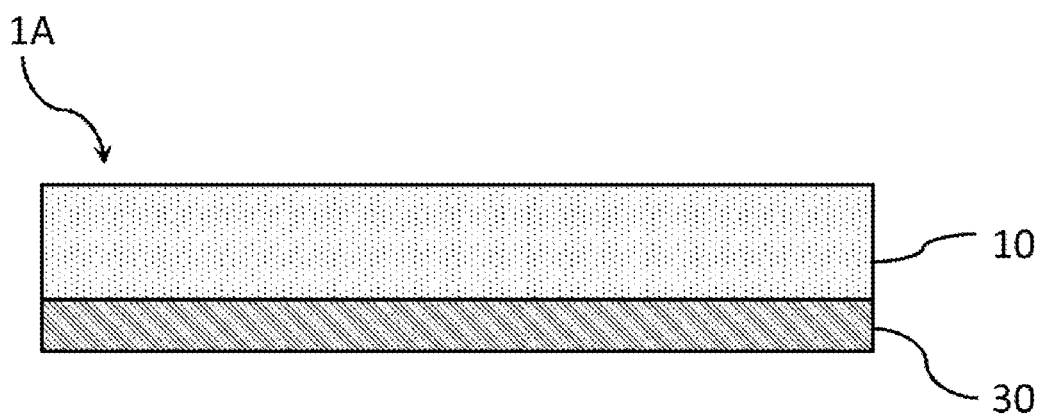
FIG. 1 is a sectional view schematically illustrating an example of an optical filter according to one embodiment.

An embodiment of the present invention will be described below.
In this specification, a near-infrared light absorbing dye and an ultraviolet light absorbing dye may be abbreviated as "NIR dye" and "UV dye," respectively.
In this specification, a compound that is represented by formula (I) will be referred to as a "compound (I)." Similar notations will be used for compounds that are represented by other formulae. A dye made of a compound (I) will be referred to as a "dye (I)" and similar notations will be used for other dyes. Furthermore, a group that is represented by formula (I) will be referred to as a "group (I)" and similar notations will be used for groups that are represented by other formulae.

In this specification, the term "internal transmittance" means a transmittance obtained by subtracting influence of interface reflection from a measured transmittance and is given by a formula {(measured transmittance)/(100−reflectance)}×100.

In this specification, as for spectrum analyses of a transmittance of a substrate, a transmittance of a resin film including a case that a dye is contained in a resin, and a transmittance that is measured in a state that a dye is dissolved in a solvent such as dichloromethane, an "internal transmittance" is meant in all cases including a case that only a word "transmittance" is used. On the other hand, a transmittance of an optical filter having a dielectric multilayer film is a measured transmittance.

In this specification, for example, the expression "the transmittance is 90% or higher in a particular wavelength range" means that the transmittance is not lower than 90% in the whole wavelength range, that is, the lowest transmittance in that wavelength range is 90% or higher. Likewise, for example, the expression "the transmittance is 1% or lower in a particular wavelength range" means that the transmittance is not higher than 1% in the whole wavelength range, that is, the highest transmittance in that wavelength range is 1% or lower. The same is true of the internal transmittance. An average transmittance or an average internal transmittance in a particular wavelength range is an arithmetic average of transmittances or internal transmittances for every 1 nm in that wavelength range.

Optical characteristics can be measured using an ultraviolet/visible spectrophotometer.

In this specification, the symbol "-" or the word "to" that is used to express a numerical range includes the numerical values before and after the symbol or the word as the upper limit and the lower limit of the range, respectively.

<Optical Filter>

An optical filter according to one embodiment of the invention (hereinafter also referred to as "present filter") is an optical filter that is equipped with a substrate and a dielectric multilayer film laid on or above at least one major surface of the substrate as an outermost layer and that satisfies particular spectroscopic characteristics to be described later.

The above-mentioned substrate includes a resin film including a dye (I) having a maximum absorption wavelength in a wavelength of 690 to 900 nm in dichloromethane, and a resin. The dye (1) is an NIR dye. Since the substrate contains a dye that absorbs near-infrared light, degradation of spectroscopic characteristics of the dielectric multilayer film at a large incident angle, for example, light passage in a near-infrared range and occurrence of noise, can be suppressed by the absorption characteristics of the substrate. Each dye and the resin will be described later.

Example of a configuration of the present filter will be described with reference to drawings. Each of FIGS. 1-4 is a schematic sectional view illustrating an example of an optical filter according to one embodiment.

An optical filter 1A illustrated in FIG. 1 is an example in which a dielectric multilayer film 30 is formed on one major surface of a substrate 10. The expression "to have a particular layer on or above a major surface of a substrate" is not limited to a case that the layer is in contact with the major surface of the substrate but includes a case that another function layer is provided between the substrate and the layer.

Figure 2:
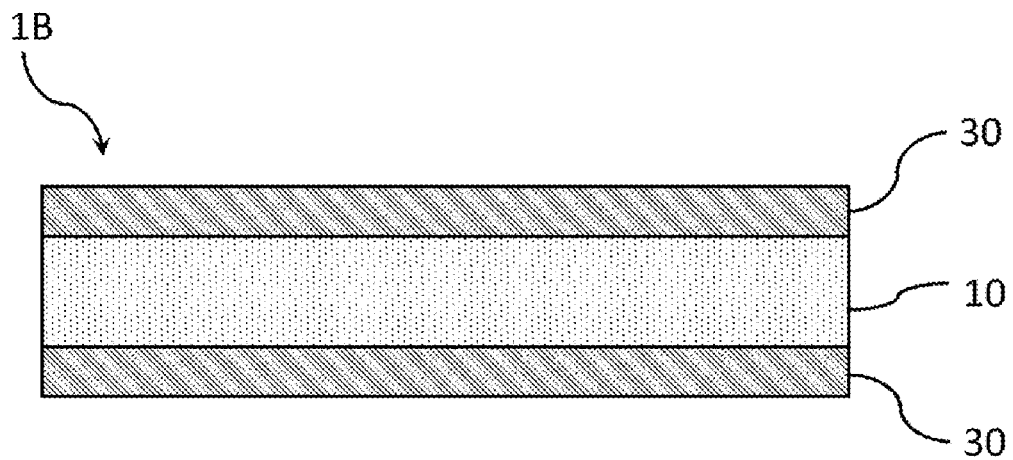
FIG. 2 is a sectional view schematically illustrating another example of an optical filter according to one embodiment.

An optical filter 1B illustrated in FIG. 2 is an example in which a dielectric multilayer film 30 is formed on both major surfaces of a substrate 10.

Figure 3:
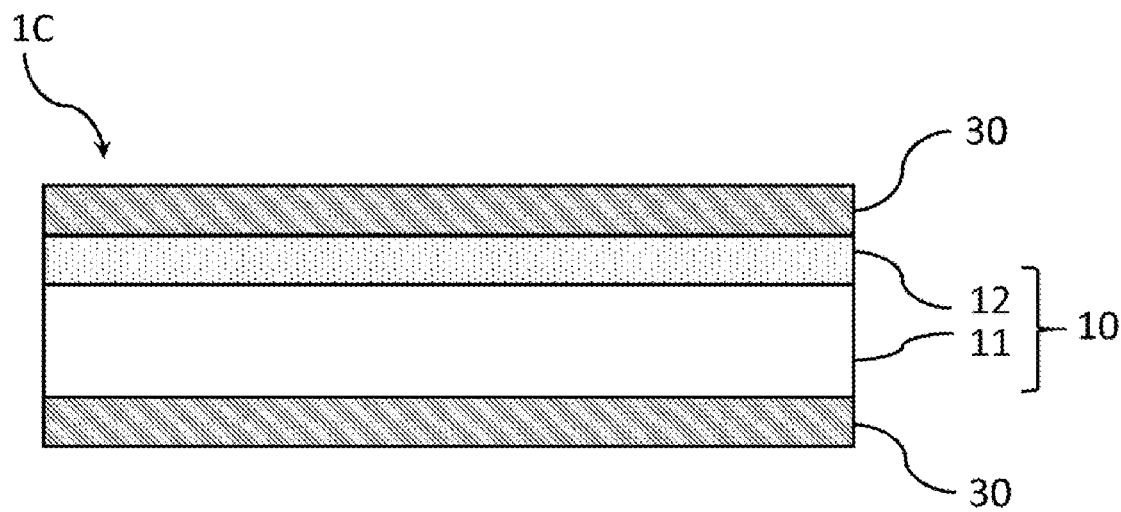
FIG. 3 is a sectional view schematically illustrating another example of an optical filter according to one embodiment.

An optical filter 1C illustrated in FIG. 3 is an example in which a substrate 10 has a support body 11 and a resin film 12 that is laid on one major surface of the support body 11. Furthermore, the optical filter 1C has dielectric multilayer films 30 formed on the resin film 12 and on the major surface, on which the resin film 12 is not laid, of the support body 11.

Figure 4:
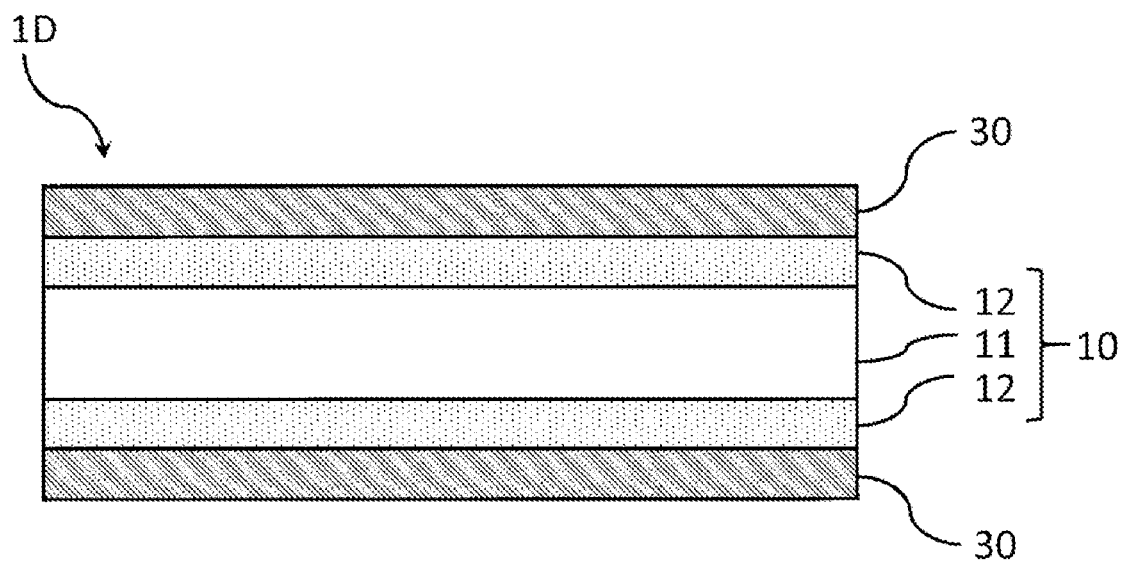
FIG. 4 is a sectional view schematically illustrating another example of an optical filter according to one embodiment.

An optical filter 1D illustrated in FIG. 4 is an example in which a substrate 10 has a support body 11 and resin films 12 that are laid on both major surfaces of the support body 11. Furthermore, the optical filter 1D has dielectric multilayer films 30 that are formed on the respective resin films 12.

The optical filter according to the invention transmits visible light and light in at least part of a wavelength of 900 to 1,000 nm and satisfies all of the following spectroscopic characteristics (i-1) to (i-6):

(i-1) a maximum transmittance $T_{700-900(0deg)MAX}$ in a spectral transmittance curve in a wavelength of 700 to 900 nm at an incident angle of 0° is 7% or lower;

(i-2) a maximum transmittance $T_{700-850(50deg)MAX}$ in a spectral transmittance curve in a wavelength of 700 to 850 nm at an incident angle of 50° is 5% or lower;

(i-3) $IR70_{900-950(0deg)} - IR10_{900-950(0deg)}$ is 20 nm or smaller, where the $IR10_{900-950(0deg)}$ and the $IR70_{900-950(0deg)}$ are shortest wavelengths at which transmittances are 10% and 70%, respectively, in a spectral transmittance curve in a wavelength of 900 to 950 nm at an incident angle of 0°;

(i-4) $IR70_{850-930(50deg)} - IR10_{850-930(50deg)}$ is 50 nm or smaller, where the $IR10_{850-930(50deg)}$ and the $IR70_{850-930(50deg)}$ are shortest wavelengths at which transmittances are 10% and 70%, respectively, in a spectral transmittance curve in a wavelength of 850 to 930 nm at an incident angle of 50°;

(i-5) an absolute value of a difference between $IR50_{850(0deg)}$ and $IR50_{850(50deg)}$ is 30 nm or smaller, where the $IR50_{850(0deg)}$ and the $IR50_{850(50deg)}$ are shortest wavelengths at which transmittances are 50% in a spectral transmittance curve in a wavelength of 850 nm or longer at incident angles of 0° and 50°, respectively; and (i-6) an average transmittance $T_{450-600(0deg)AVE}$ in a spectral transmittance curve in a wavelength of 450 to 600 nm at an incident angle of 0° is 60% or higher.

The present filter which satisfies all of the spectroscopic characteristics (i-1) to (i-6) is an optical filter that exhibits high transparency for visible light and particular near-infrared light, blocks near-infrared light in the other wavelength ranges, and is suppressed in the reduction of a near-infrared light blocking ability at large incident angles.

The satisfaction of the spectroscopic characteristic (i-1) means a high blocking ability in a wavelength of 700 to 900 nm. It is preferable that $T_{700-900(0deg)MAX}$ be 6.5% or lower, even preferably 6% or lower.

The satisfaction of the spectroscopic characteristic (i-2) means a high blocking ability in a wavelength of 700 to 850 nm even at large incident angles. It is preferable that the $T_{700-850(50deg)MAX}$ be 4.5% or lower, even preferably 4% or lower.

The satisfaction of the spectroscopic characteristic (i-3) means that the slope of a spectral transmittance curve is steep in an NIR absorption band in a wavelength of 900 to 950 nm. It is preferable that the $IR70_{900-950(0deg)}$–the $IR10_{900-950(0deg)}$ be 18.5 nm or smaller, even preferably 17 nm or smaller.

The satisfaction of the spectroscopic characteristic (i-4) means that the slope of a spectral transmittance curve is steep in the NIR absorption band in a wavelength of 850 to 930 nm even at large incident angles. It is preferable that the $IR70_{850-930(50deg)}$–the $IR10_{850-930(50deg)}$ be 47.5 nm or smaller, even preferably 45 nm or smaller.

The satisfaction of the spectroscopic characteristic (i-5) means that a shift is small and the color reproducibility is high even at large incident angles in the NIR absorption band in a wavelength of 850 nm or longer. It is preferable that the absolute value of the difference between the $IR50_{850(0deg)}$ and the $IR50_{850(50deg)}$ be 29 nm or smaller, even preferably 28 nm or smaller.

The satisfaction of the spectroscopic characteristic (i-6) means that the transparency in a visible light range is high. It is preferable that the $T_{450-600(0deg)AVE}$ be 75% or higher, even preferably 78% or higher.

It is preferable that the optical filter further satisfy the following spectroscopic characteristic (i-7):
(i-7) an average transmittance $T_{930-950(0deg)AVE}$ in a spectral transmittance curve in a wavelength of 930 to 950 nm is 70% or higher.

The satisfaction of the spectroscopic characteristic (i-7) means that the transparency in a near-infrared wavelength of 930 to 950 nm is high. It is preferable that the $T_{930-950(0deg)AVE}$ be 74% or higher, even preferably 78% or higher.

<Substrate>

In the optical filter according to the invention, the substrate has an NIR dye (I) (described later) and a resin film that contains a resin.

<Spectroscopic Characteristics of Resin Film>

It is preferable that the resin film satisfy all of the following spectroscopic characteristics (ii-1) to (ii-5):
(ii-1) an average internal transmittance $T_{450-600AVE}$ in a spectral transmittance curve in a wavelength of 450 to 600 nm is 80% or higher;
(ii-2) a wavelength IR50 at which an internal transmittance is 50% is in a wavelength of 620 to 660 nm;
(ii-3) an average internal transmittance $T_{700-830AVE}$ in a spectral transmittance curve in a wavelength of 700 to 830 nm is 5% or lower;
(ii-4) a maximum internal transmittance $T_{720-830MAX}$ in a spectral transmittance curve in a wavelength of 720 to 830 nm is 10% or lower; and
(ii-5) an absolute value of a difference between IR20 and IR80 is 50 nm or smaller, where the IR20 and the IR80 are shortest wavelengths at which internal transmittances are 20% and 80%, respectively, in a wavelength of 850 to 950 nm.

The satisfaction of the spectroscopic characteristic (ii-1) means that the transparency in a visible range is high.

It is preferable that the $T_{450-600AVE}$ be 82.5% or higher, even preferably 85% or higher.

The satisfaction of the spectroscopic characteristic (ii-2) means that an oblique incidence shift of a dielectric multilayer film that is high in the transmittance in a red band and in the blocking ability in a near-infrared wavelength of 750 to 900 nm can be compensated. It is preferable that the IR50 be in a wavelength of 620 to 655 nm, even preferably 625 to 650 nm.

The satisfaction of the spectroscopic characteristic (ii-3) means that the blocking ability in a near-infrared wavelength of 700 to 830 nm is high. It is preferable that the $T_{700-830AVE}$ be 4% or lower, even preferably 3% or lower.

The satisfaction of the spectroscopic characteristic (ii-4) means that the blocking ability in a near-infrared wavelength of 720 to 830 nm is high. It is preferable that the $T_{720-830MAX}$ be 8.5% or lower, even preferably 7% or lower.

The satisfaction of the spectroscopic characteristic (ii-5) means that the slope of a spectral transmittance curve is steep in an NIR absorption band in a wavelength of 850 to 950 nm. It is preferable that the absolute value of the difference between the IR20 and the IR80 be 47.5 nm or smaller, even preferably 45 nm or smaller.

<NIR Dye>

The NIR dye (I) is an NIR dye having a maximum absorption wavelength of 690 to 900 nm in dichloromethane. Containing this dye makes it possible to cut near-infrared light effectively.

It is preferable that the dye (I) satisfy the following spectroscopic characteristic (iii-1) in a spectral internal transmittance curve measured by dissolving the dye (I) in the resin so that an internal transmittance at a maximum absorption wavelength in the resin included in the resin film becomes 10%:
(iii-1) E>103.5−(D/100), where the D (nm) is the maximum absorption wavelength and the E is an average interval transmittance in a wavelength of 450 to 600 nm.

The characteristic (iii-1) prescribes a relationship between the maximum absorption wavelength and the transmittance. The dye (I)'s satisfying the characteristic (iii-1) means that the transmittance is high in a visible wavelength of 450 to 600 nm with any maximum absorption wavelength.

The NIR dye (I) may either be composed of one kind of compound or contain two or more kinds of compounds each having a maximum absorption wavelength of 690 to 900 nm in dichloromethane. From the viewpoint of efficiently blocking light between two ranges of visible light and particular near-infrared light that passes through the present filter, it is preferable that the NIR dye (I) contain three or more kinds of compounds having a maximum absorption wavelength of 690 to 900 nm in dichloromethane. In particular, it is more preferable that the NIR dye (I) contain one or more compounds (A) to compounds (C) having the following characteristics:
the compounds (A) each have, in dichloromethane, a maximum absorption wavelength in a wavelength of 690 nm or longer and shorter than 735 nm;
the compounds (B) each have, in dichloromethane, a maximum absorption wavelength in a wavelength of 735 nm or longer and shorter than 830 nm; and
the compounds (C) each have, in dichloromethane, a maximum absorption wavelength in a wavelength of 830 nm or longer and shorter than 900 nm.

It is preferable that the compound(s) (A) be at least one selected from squarylium dyes, phthalocyanine dyes, and cyanine dyes.

It is preferable that the compound(s) (B) be at least one selected from squarylium dyes, phthalocyanine dyes, and cyanine dyes.

It is preferable that the compound(s) (C) be at least one selected from squarylium dyes, phthalocyanine dyes, cyanine dyes, and diimonium dyes.

From the viewpoints of transparency in a visible range, solubility in a resin, and durability, it is preferable that the NIR dye be a squarylium dye(s) or a cyanine dye(s).

<Squarylium Dye>

It is preferable that the squarylium dye be a compound represented by the following Formula (I) or (II).

It is noted that in the case where the same symbol appears two or more times in a squarylium dye compound, those symbols may represent either the same thing or different things. This also applies to a cyanine dye.

<Squarylium Compound (I)>

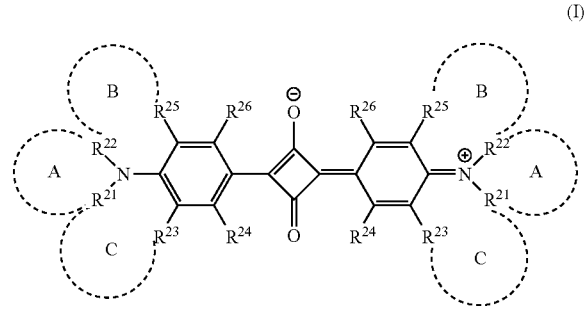

(I)

Symbols in the above formula have the following meanings.

$R^{24}$ and $R^{26}$ represent, independently of each other, a hydrogen atom, a halogen atom, a hydroxyl group, an alkyl group or an alkoxy group (each of them has a carbon number of 1 to 20), an acyloxy group having a carbon number of 1 to 10, an aryl group having a carbon number of 6 to 11, an alaryl group having a carbon number of 7 to 18 that may include a substituent and may have an oxygen atom between carbon atoms, —$NR^{27}R^{28}$ ($R^{27}$ and $R^{28}$ represent, independently of each other, a hydrogen atom or an alkyl group having a carbon number of 1 to 20), —C(=O)—$R^{29}$ ($R^{29}$ represents a hydrogen atom, a halogen atom, a hydroxyl group, or a hydrocarbon group having a carbon number of 1 to 25 that may include a substituent and may include an unsaturated bond, an oxygen atom, or a saturated or unsaturated ring structure between carbon atoms), —$NHR^{30}$ or $SO_2$—$R^{30}$ (each $R^{30}$ represents a hydrocarbon group having a carbon number of 1 to 25 in which one or more hydrogen atoms may be replaced by a halogen atom, a hydroxyl group, a carboxy group, a sulfo group, or a cyano group and that may include an unsaturated bond, an oxygen atom, or a saturated or unsaturated ring structure between carbon atoms), or a group represented by the following Formula(S) ($R^{41}$ and $R^{42}$ represent, independently of each other, a hydrogen atom, a halogen atom, or an alkyl group or an alkoxy group (each of them has a carbon number of 1 to 10) and k represents 2 or 3).

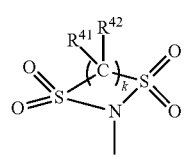

(S)

$R^{21}$ and $R^{22}$, $R^{22}$ and $R^{25}$, and $R^{21}$ and $R^{23}$ may be connected to form a heterocycle A, a heterocycle B, and a heterocycle C each having five or six members, respectively, together with a nitrogen atom.

$R^{21}$ and $R^{22}$ form, in the case where the heterocycle A is formed, as a divalent group —Q— as a result of their connection, an alkylene group or an alkyleneoxy group whose hydrogen atom may be replaced by an alkyl group having a carbon number of 1 to 6, an aryl group having a carbon number of 6 to 10, or an acyloxy group having a carbon number of 1 to 10 that may include a substituent.

$R^{22}$ and $R^{25}$ form, in the case where the heterocycle B is formed, as a result of their connection, and $R^{21}$ and $R^{23}$ form, in the case where the heterocycle C is formed, as a result of their connection, divalent groups —$X^1$—$Y^1$— and —$X^2$—$Y^2$— (the side of connection to the nitrogen is $X^1$ and $X^2$) that are groups in which each of $X^1$ and $X^2$ is represented by the following Formula (1x) or (2x) and each of $Y^1$ and $Y^2$ is represented by one of the following Formulae (1y) to (5y). In the case where each of $X^1$ and $X^2$ is a group represented by the following Formula (2x), each of $Y^1$ and $Y^2$ may be a single bond in which case an oxygen atom may exist between carbon atoms.

(1x)

(2x)

(1y)

(2y)

(3y)

(4y)

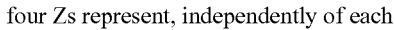

(5y)

In Formula (1x), four Zs represent, independently of each other, a hydrogen atom, a hydroxyl group, an alkyl group or an alkoxy group (each of them has a carbon number of 1 to 6), or —$NR^{38}R^{39}$ ($R^{38}$ and $R^{39}$ represent, independently of each other, a hydrogen atom or an alkyl group having a carbon number of 1 to 20). $R^{31}$ to $R^{36}$ represent, independently of each other, a hydrogen atom, an alkyl group having a carbon number of 1 to 6, or an aryl group having a carbon number of 6 to 10. $R^{37}$ represents an alkyl group having a carbon number of 1 to 6 or an aryl group having a carbon number of 6 to 10.

Each of $R^{27}$, $R^{28}$, $R^{29}$, $R^{31}$ to $R^{37}$, and $R^{21}$ to $R^{23}$ and $R^{25}$ not forming a heterocycle may form a 5-membered ring or a 6-membered ring by connecting to another one of them. $R^{31}$ and $R^{36}$ and/or $R^{31}$ and $R^{37}$ may be connected to each other directly.

In the case where a heterocycle in not formed, $R^{21}$, $R^{22}$, $R^{23}$, and $R^{25}$ represent, independently of each other, a hydrogen atom, a halogen atom, a hydroxyl group, an alkyl group or an alkoxy group (each of them has a carbon number of 1 to 20), an acyloxy group having a carbon number of 1-10, an aryl group having a carbon number of 6 toll, or an alaryl group having a carbon number of 7 to 18 that may include a substituent and may have an oxygen atom between carbon atoms.

For example, the compound (I) is a compound represented by one of Formulae (I-1) to (I-3). From the viewpoints of solubility in a resin, heat resistance and light resistance in a resin, and the visible light transmittance of a resin layer containing it, it is particularly preferable that the compound (I) be a compound represented by Formula (I-1).

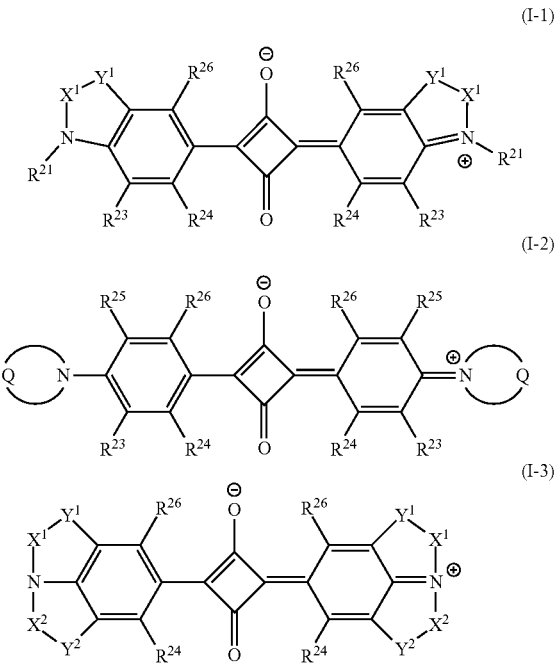

The symbols used in Formulae (I-1) to (I-3) have the same meanings as the same symbols used in Formula (I) and preferable modes of implementation of what are represented by the former are also the same as those of the latter.

In the compound (I-1), $X^1$ is preferably the group (2x) and $Y^1$ is preferably a single bond or the group (1y). In this case, $R^{31}$ to $R^{36}$ are preferably a hydrogen atom or an alkyl group having a carbon number of 1 to 3 and even preferably a hydrogen atom or a methyl group. Specific examples of —$Y^1$—$X^1$— include a divalent organic group represented by one of the following Formulae (11-1) to (12-3).

In the compound (1-1), from the viewpoints of solubility, heat resistance, and the steepness of a variation around the boundary between a visible range and a near-infrared range of a spectral transmittance curve, it is even preferable that each of $R^{21}$ be, independently of each other, a group represented by the following Formula (4-1) or (4-2):

In Formulae (4-1) and (4-2), $R^{71}$ to $R^{75}$ represent, independently of each other, a hydrogen atom, a halogen atom, or an alkyl group having a carbon number of 1 to 4.

In the compound (I-1), it is preferable that $R^{24}$ be —$NR^{27}R^{28}$. From the viewpoint of solubility in a resin and a coating solvent, it is preferable that —$NR^{27}R^{28}$ be —NH—C(=O)—$R^{29}$ or —NH—$SO_2$—$R^{30}$.

Formula (1-11) represents a compound that is a version of the compound (1-1) in which $R^{24}$ is —NH—C(=O)—$R^{29}$.

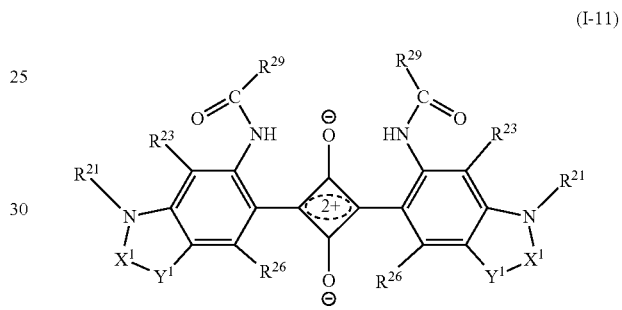

It is preferable that $R^{23}$ and $R^{26}$ be, independently of each other, a hydrogen atom, a halogen atom, or an alkyl group or an alkoxy group (each of them has a carbon number of 1 to 6). It is even preferable that each of $R^{23}$ and $R^{26}$ be a hydrogen atom.

It is preferable that $R^{29}$ be an alkyl group having a carbon number of 1 to 20 that may include a substituent, an aryl group having a carbon number of 6 to 10 that may include a substituent, or an alaryl group having a carbon number of 7 to 18 that may have an oxygen atom between carbon atoms. Examples of the substituent include a hydroxyl group, a carboxy group, a sulfo group, a cyano group, an alkyl group having a carbon number of 1 to 6, a fluoroalkyl group having a carbon number of 1 to 6, an alkoxy having a carbon number of 1 to 6, and an acyloxy group having a carbon number of 1 to 6.

It is preferable that $R^{29}$ be a group that is selected from a linear, branched, or cyclic alkyl group having a carbon number of 1 to 17, a phenyl group that may be replaced by an alkoxy group having a carbon number of 1 to 6, and an alaryl group having a carbon number of 7 to 18 that may have an oxygen atom between carbon atoms.

Usable as each of $R^{29}$ independently of each other is a group that is a hydrocarbon group having at least one branch and having a carbon number of 5 to 25 in which one or more hydrogen atoms may be replaced by a hydroxyl group, a carboxy group, a sulfo group, or a cyano group and that may include an unsaturated bond, an oxygen atom, or a saturated or unsaturated ring structure between carbon atoms.

More specific examples of the compound (1-11) include compounds shown in the following table. In the compounds shown in the following table, each symbol has the same meaning on whichever side of the squarylium framework it exists.

TABLE 1

| Dye symbol | Substituent | | | | |
|---|---|---|---|---|---|
| | $-Y^1-X^1-$ | $R^{21}$ | $R^{29}$ | $R^{23}$ | $R^{26}$ |
| (1-11-1) | (11-1) | $-CH_3$ | $-C_8H_{17}$ | H | H |
| (1-11-2) | (11-1) | $-CH_3$ | $-CH(CH_3)(nC_3H_7)$ | H | H |
| (1-11-3) | (11-1) | $-CH_3$ | $-CH(C_2H_5)(nC_4H_9)$ | H | H |
| (1-11-4) | (11-1) | $-CH_3$ | $-CH(nC_3H_7)_2$ | H | H |
| (1-11-5) | (11-1) | $-CH_3$ | $-C(CH_3)_2(nC_3H_7)$ | H | H |
| (1-11-6) | (11-1) | $-C_2H_5$ | $-nC_8H_{17}$ | H | H |
| (1-11-7) | (11-1) | $-C_2H_5$ | $-CH(CH_3)(nC_3H_7)$ | H | H |
| (1-11-8) | (11-1) | $-C_2H_5$ | $-CH(C_2H_5)(nC_4H_9)$ | H | H |
| (1-11-9) | (11-1) | $-C_2H_5$ | $-CH(nC_3H_7)_2$ | H | H |
| (1-11-10) | (11-1) | $-C_2H_5$ | $-C(CH_3)_2(nC_3H_7)$ | H | H |
| (1-11-11) | (11-1) | $-CH(CH_3)_2$ | $-nC_8H_{17}$ | H | H |
| (1-11-12) | (11-1) | $-CH(CH_3)_2$ | $-CH(CH_3)(nC_3H_7)$ | H | H |
| (1-11-13) | (11-1) | $-CH(CH_3)_2$ | $-CH(C_2H_5)(nC_4H_9)$ | H | H |
| (1-11-14) | (11-1) | $-CH(CH_3)_2$ | $-CH(nC_3H_7)_2$ | H | H |
| (1-11-15) | (11-1) | $-CH(CH_3)_2$ | $-C(CH_3)_2(nC_3H_7)$ | H | H |
| (1-11-16) | (11-4) | $-CH_3$ | $-nC_8H_{17}$ | H | H |
| (1-11-17) | (11-4) | $-CH_3$ | $-CH(CH_3)(nC_3H_7)$ | H | H |
| (1-11-18) | (11-4) | $-CH_3$ | $-CH(C_2H5)(nC_4H_9)$ | H | H |
| (1-11-19) | (11-4) | $-CH_3$ | $-CH(nC_3H_7)_2$ | H | H |
| (1-11-20) | (11-4) | $-CH_3$ | $-C(CH_3)_2(nC_3H_7)$ | H | H |
| (1-11-21) | (11-4) | $-C_2H_5$ | $-nC_8H_{17}$ | H | H |
| (1-11-22) | (11-4) | $-C_2H_5$ | $-CH(CH_3)(nC_3H_7)$ | H | H |
| (1-11-23) | (11-4) | $-C_2H_5$ | $-CH(C_2H_5)(nC_4H_9)$ | H | H |
| (1-11-24) | (11-4) | $-C_2H_5$ | $-CH(nC_3H_7)_2$ | H | H |
| (1-11-25) | (11-4) | $-C_2H_5$ | $-C(CH_3)_2(nC_3H_7)$ | H | H |
| (1-11-26) | (11-4) | $-CH(CH_3)_2$ | $-nC_8H_{17}$ | H | H |
| (1-11-27) | (11-4) | $-CH(CH_3)_2$ | $-CH(CH_3)(nC_3H_7)$ | H | H |
| (1-11-28) | (11-4) | $-CH(CH_3)_2$ | $-CH(C_2H_5)(nC_4H_9)$ | H | H |
| (1-11-29) | (11-4) | $-CH(CH_3)_2$ | $-CH(nC_3H_7)_2$ | H | H |
| (1-11-30) | (11-4) | $-CH(CH_3)_2$ | $-C(CH_3)_2(nC_3H_7)$ | H | H |

Among these examples of the compound (I-11), the compounds (I-11-11) to (I-11-15), (I-11-26) to (I-11-30), etc. are preferable from the viewpoints of transparency in a visible range and solubility in a resin.

Formula (I-12) represents a compound that is a version of the compound (I-1) in which $R^{24}$ is $-NH-SO_2-R^{30}$.

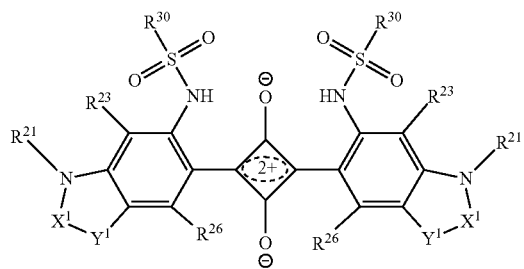

(I-12)

It is preferable that $R^{23}$ and $R^{26}$ be, independently of each other, a hydrogen atom, a halogen atom, or an alkyl group or an alkoxy group (each of them has a carbon number of 1 to 6). It is even preferable that each of $R^{23}$ and $R^{26}$ be a hydrogen atom.

From the viewpoint of light resistance, it is preferable that each of $R^{30}$ be, independently of each other, an alkyl group or an alkoxy group (each of them has a carbon number of 1 to 12 and may have a branch) or a hydrocarbon group having a carbon number of 6 to 16 that includes an unsaturated ring structure. Examples of the unsaturated ring structure include benzene, toluene, xylene, furan, and benzofuran. It is even preferable that each of $R^{30}$ be, independently of each other, an alkyl group or an alkoxy group (each of them has a carbon number of 1 to 12 and may have a branch). It is noted that in each group represented by $R^{30}$ all or part of the hydrogen atoms may be replaced by a halogen atom, in particular, a fluorine atom.

More specific examples of the compound (I-12) include compounds shown in the following table. In the compounds shown in the following table, each symbol has the same meaning on whichever side of the squarylium framework it exists.

TABLE 2

| Dye symbol | Substituent | | | | |
|---|---|---|---|---|---|
| | $-Y^1-X^1-$ | $R^{21}$ | $R^{29}$ | $R^{23}$ | $R^{26}$ |
| (I-12-1) | (11-1) | $-CH_3$ | $-C_8H_{17}$ | H | H |
| (I-12-2) | (11-1) | $-CH_3$ | $-CH(CH_3)(nC_3H_7)$ | H | H |
| (I-12-3) | (11-1) | $-CH_3$ | $-CH(C_2H_5)(nC_4H_9)$ | H | H |
| (I-12-4) | (11-1) | $-CH_3$ | $-CH(nC_3H_7)_2$ | H | H |
| (I-12-5) | (11-1) | $-CH_3$ | $-C(CH_3)_2(nC_3H_7)$ | H | H |
| (I-12-6) | (11-1) | $-C_2H_5$ | $-nC_8H_{17}$ | H | H |
| (I-12-7) | (11-1) | $-C_2H_5$ | $-CH(CH_3)(nC_3H_7)$ | H | H |
| (I-12-8) | (11-1) | $-C_2H_5$ | $-CH(C_2H_5)(nC_4H_9)$ | H | H |
| (I-12-9) | (11-1) | $-C_2H_5$ | $-CH(nC_3H_7)_2$ | H | H |
| (I-12-10) | (11-1) | $-C_2H_5$ | $-C(CH_3)_2(nC_3H_7)$ | H | H |
| (I-12-11) | (11-1) | $-CH(CH_3)_2$ | $-nC_8H_{17}$ | H | H |
| (I-12-12) | (11-1) | $-CH(CH_3)_2$ | $-CH(CH_3)(nC_3H_7)$ | H | H |
| (I-12-13) | (11-1) | $-CH(CH_3)_2$ | $-CH(C_2H_5)(nC_4H_9)$ | H | H |
| (I-12-14) | (11-1) | $-CH(CH_3)_2$ | $-CH(nC_3H_7)_2$ | H | H |
| (I-12-15) | (11-1) | $-CH(CH_3)_2$ | $-C(CH_3)_2(nC_3H_7)$ | H | H |
| (I-12-16) | (11-4) | $-CH_3$ | $-nC_8H_{17}$ | H | H |
| (I-12-17) | (11-4) | $-CH_3$ | $-CH(CH_3)(nC_3H_7)$ | H | H |
| (I-12-18) | (11-4) | $-CH_3$ | $-CH(C_2H_5)(nC_4H_9)$ | H | H |
| (I-12-19) | (11-4) | $-CH_3$ | $-CH(nC_3H_7)_2$ | H | H |
| (I-12-20) | (11-4) | $-CH_3$ | $-C(CH_3)_2(nC_3H_7)$ | H | H |
| (I-12-21) | (11-4) | $-C_2H_5$ | $-nC_8H_{17}$ | H | H |
| (I-12-22) | (11-4) | $-C_2H_5$ | $-CH(CH_3)(nC_3H_7)$ | H | H |
| (I-12-23) | (11-4) | $-C_2H_5$ | $-CH(C_2H_5)(nC_4H_9)$ | H | H |
| (I-12-24) | (11-4) | $-C_2H_5$ | $-CH(nG_3H_7)_2$ | H | H |
| (I-12-25) | (11-4) | $-C_2H_5$ | $-C(CH_3)_2(nC_3H_7)$ | H | H |
| (I-12-26) | (11-4) | $-CH(CH_3)_2$ | $-nC_8H_{17}$ | H | H |
| (I-12-27) | (11-4) | $-CH(CH_3)_2$ | $-CH(CH_3)(nC_3H_7)$ | H | H |
| (I-12-28) | (11-4) | $-CH(CH_3)_2$ | $-CH(C_2H_5)(nC_4H_9)$ | H | H |
| (I-12-29) | (11-4) | $-CH(CH_3)_2$ | $-CH(nC_3H_7)_2$ | H | H |
| (I-12-30) | (11-4) | $-CH(CH_3)_2$ | $-C(CH_3)_2(nC_3H_7)$ | H | H |

Among these examples of the compound (I-12), the compounds (I-12-11) to (I-12-15), (I-12-26) to (I-12-30), etc. are preferable from the viewpoints of transparency in a visible range and solubility in a resin.

<Squarylium Compound (II)>

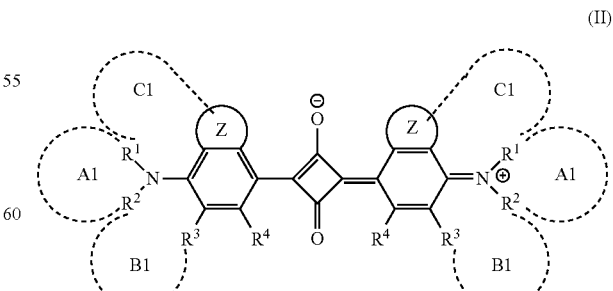

(II)

Symbols in the above formula have the following meanings.

Rings Z are, independently of each other, a 5-membered ring or a 6-membered ring having zero to three heteroatoms in the ring. The hydrogen atoms belonging to each ring Z may each be replaced.

$R^1$ and $R^2$, $R^2$ and $R^3$, and $R^1$ and a carbon atom or a heteroatom included in the ring Z may form a heterocycle A1, a heterocycle B1, and a heterocycle C1, respectively, together with a nitrogen atom through mutual connection. In this case, the hydrogen atoms included in each of the heterocycles A1, B1, and C1 may be replaced. $R^1$ and $R^2$ represent, in the case where they do not form the heterocycle, independently of each other, a hydrogen atom, a halogen atom, or a hydrocarbon group that may include an unsaturated bond, a heteroatom, or a saturated or unsaturated ring structure between carbon atoms and may include a substituent. $R^4$ and $R^3$ that does not form the heterocycle represent, independently of each other, a hydrogen atom, a halogen atom, or an alkyl group or an alkoxy group (each of them may include a heteroatom between carbon atoms and may include a substituent).

Examples of the compound (II) include a compound represented by one of Formulae (II-1) to (II-3). The compound represented by Formula (II-3) is particularly preferable from the viewpoints of solubility in a resin and visible light transparency in a resin.

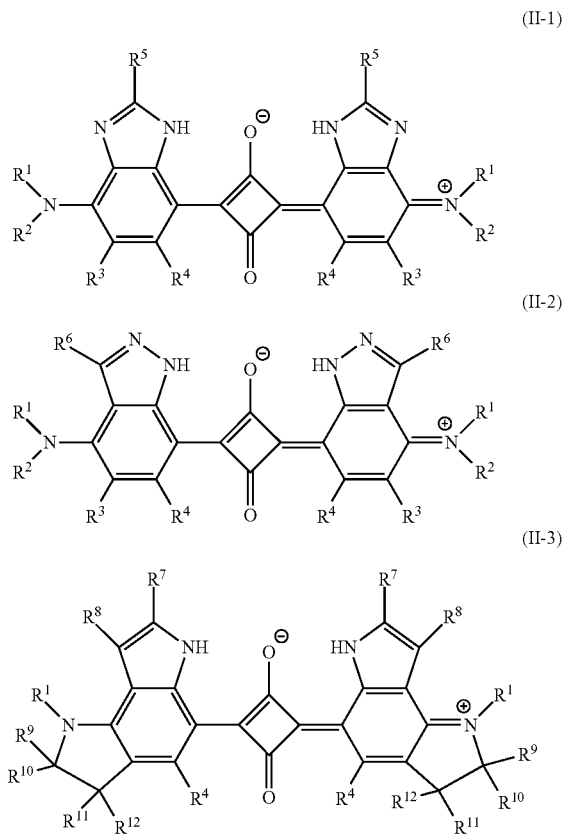

In Formulae (II-1) and (II-2), $R^1$ and $R^2$ represent, independently of each other, a hydrogen atom, a halogen atom, or an alkyl group having a carbon number of 1 to 15 that may include a substituent. $R^3$ to $R^6$ represent, independently of each other, a hydrogen atom, a halogen atom, or an alkyl group having a carbon number of 1 to 10 that may include a 5 substituent.

In Formula (II-3), $R^1$, $R^4$, and $R^9$ to $R^{12}$ represent, independently of each other, a hydrogen atom, a halogen atom, or an alkyl group having a carbon number of 1 to 15 that may include a substituent. $R^7$ and $R^8$ represent, independently of each other, a hydrogen atom, a halogen atom, or an alkyl group having a carbon number of 1 to 5 that may include a substituent.

From the viewpoints of solubility in a resin, visible light transparency, etc., it is preferable that $R^1$ and $R^2$ in the compounds (II-1) and (II-2) represent, independently of each other, an alkyl group having a carbon number of 1 to 15, even preferably an alkyl group having a carbon number of 7 to 15. It is further preferable that at least one of $R^1$ and $R^2$ be an alkyl group having a carbon number of 7 to 15 that includes a branched chain. It is particularly preferable that both of $R^1$ and $R^2$ be an alkyl group having a carbon number of 8 to 15 that includes a branched chain.

From the viewpoints of solubility in a transparent resin, visible light transparency, etc., it is preferable that each of $R^1$ in the compound (II-3) represents, independently of each other, an alkyl group having a carbon number of 1 to 15, even preferably an alkyl group having a carbon number of 1 to 10 and particularly preferably an ethyl group or an isopropyl group.

From the viewpoints of visible light transparency and the ease of synthesis, it is preferable that $R^4$ represent a hydrogen atom or a halogen atom, particularly preferably a hydrogen atom.

It is preferable that $R^7$ and $R^8$ represent, independently of each other, a hydrogen atom, a halogen atom, or an alkyl group having a carbon number of 1 to 5 that may be replaced by a halogen atom, even preferably a hydrogen atom, a halogen atom, or a methyl group.

It is preferable that $R^9$ to $R^{12}$ represent, independently of each other, a hydrogen atom, a halogen atom, or an alkyl group having a carbon number of 1 to 5 that may be replaced by a halogen atom.

Examples of $—CR^9R^{10}—CR^{11}R^{12}$- include divalent an organic group represented by one of the following groups (13-1) to (13-5):

More specific examples of the compound (II-3) include compounds shown in the following table. In the compounds shown in the following table, each symbol has the same meaning on whichever side of the squarylium framework it exists.

TABLE 3

| Dye symbol | Substituent | | | | |
|---|---|---|---|---|---|
| | -CR$^9$R$^{10}$-CR$^{11}$R$^{12}$- | R$^1$ | R$^4$ | R$^7$ | R$^8$ |
| (II-3-1) | (13-1) | —C$_2$H$_5$ | H | H | H |
| (II-3-2) | (13-5) | —C$_2$H$_5$ | H | H | H |
| (II-3-3) | (13-1) | CH(CH$_3$)$_2$ | H | H | —CH$_3$ |

Each of the compounds (I) and (II) can be manufactured by a known method(s). The compound (I) can be manufactured by methods described in U.S. Pat. No. 5,543,086B, US2014/0061505, and WO2014/088063. The compound (II) can be manufactured by a method described in WO2017/135359.

<Cyanine Dye>

It is preferable that the cyanine dye be a compound represented by the following Formula (III), (IV), (V), or (VI).

<Cyanine Compounds (I) and (IV)>

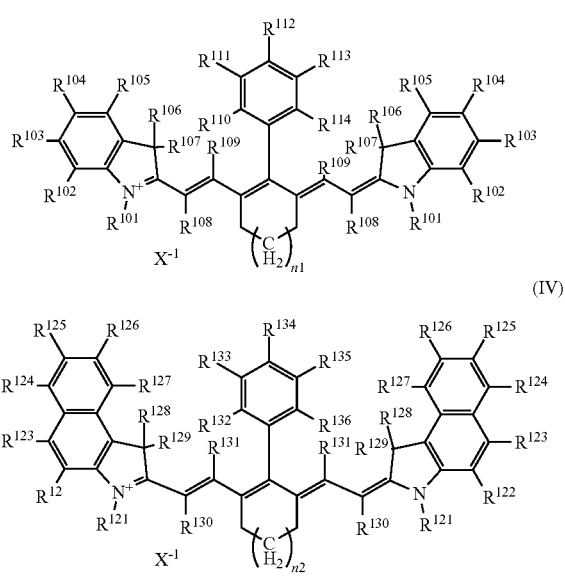

Symbols in the above formulae have the following meanings.

$R^{101}$ to $R^{109}$ and $R^{121}$ to $R^{131}$ represent, independently of each other, a hydrogen atom, a halogen atom, an alkyl group having a carbon number of 1 to 15 that may include a substituent, or an aryl group having a carbon number of 5 to 20. $R^{110}$ to $R^{114}$ and $R^{132}$ to $R^{136}$ represent, independently of each other, a hydrogen atom, a halogen atom, or an alkyl group having a carbon number of 1 to 15.

$X^-$ represents a monovalent anion.

Symbols n1 and n2 represent 0 or 1. A hydrogen atom connected to the carbon ring including $-(CH_2)_{n1}-$ and a hydrogen atom connected to the carbon ring including $-(CH_2)_{n2}-$ may be replaced by a halogen atom, an alkyl group having a carbon number of 1 to 15 that may include a substituent, or an aryl group having a carbon number of 5 to 20.

The above-mentioned alkyl group (including an alkyl group included in an alkoxy group) may be linear and include a branch structure or a saturated ring structure. The term "aryl group" means a group that is connected via a carbon atom that is a member of an aromatic ring of an aromatic compound, such as a benzene ring, a naphthalene ring, biphenyl, a furan ring, a thiophene ring, or a pyrrole ring. Examples of the substituent included in the alkyl group or alkoxy group (each of them has a carbon number of 1 to 15 and may include a substituent) or the aryl group having a carbon number of 5 to 20 include a halogen atom and an alkoxy group having a carbon number of 1 to 10.

In Formulae (III) and (IV), it is preferable that $R^{101}$ and $R^{121}$ be an alkyl group having a carbon number of 1 to 15 or an aryl group having a carbon number of 5 to 20, even preferably an alkyl group having a carbon number of 1 to 15 that has a branch from the viewpoint of maintaining a high visible light transmittance in a resin.

In Formulae (III) and (IV), it is preferable that $R^{102}$ to $R^{105}$, $R^{108}$, $R^{109}$, $R^{122}$ to $R^{127}$, $R^{130}$, and $R^{131}$ be, independently of each other, a hydrogen atom, an alkyl group or an alkoxy group (each of them has a carbon number of 1 to 15), or an aryl group having a carbon number of 5 to 20. A hydrogen atom is even preferable from the viewpoint that a high visible light transmittance can be obtained.

In Formulae (III) and (IV), it is preferable that $R^{110}$ to $R^{114}$ and $R^{132}$ to $R^{136}$ be, independently of each other, a hydrogen atom or an alkyl group having a carbon number of 1 to 15. A hydrogen atom is even preferable from the viewpoint that high visible light transmittance can be obtained.

It is preferable that $R^{106}$, $R^{107}$, $R^{128}$, and $R^{129}$ be, independently of each other, a hydrogen atom, an alkyl group having a carbon number of 1 to 15, or an aryl group having a carbon number of 5 to 20 (it may include a chain, cyclic, or branched alkyl group), even preferably a hydrogen atom or an alkyl group having a carbon number of 1 to 15. It is preferable that $R^{106}$ and $R^{107}$ be the same group and $R^{128}$ and $R^{129}$ be the same group.

Examples of $X^-$ include $I^-$, $BF_4^-$, $PF_6^-$, $ClO_4^-$, and anions represented by the following Formulae (X1) or (X2), among which $BF_4^-$ and $PF_6^-$ are preferable.

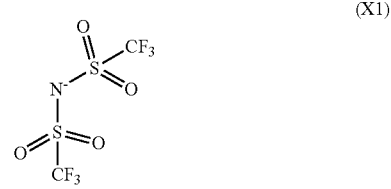

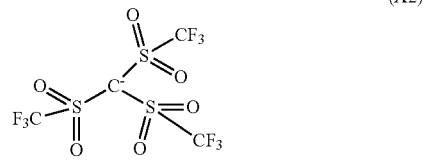

In the following description, the portion of the dye (III) excluding $R^{101}$ to $R^{114}$ is also referred to as a framework (III). This kind of notification also applies to the dye (IV).

A compound in which n1 in Formula (III) is 1 is represented by the following Formula (III-1) and a compound in which n1 in Formula (III) is 0 is represented by the following Formula (III-2).

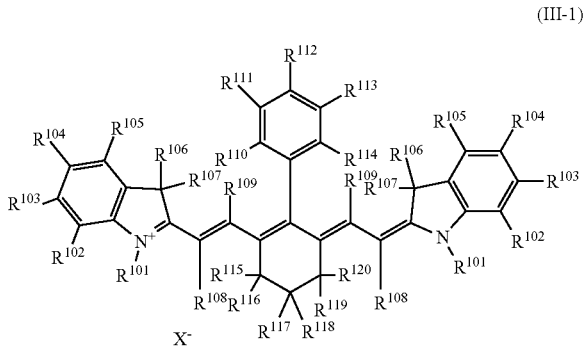

-continued (III-2)

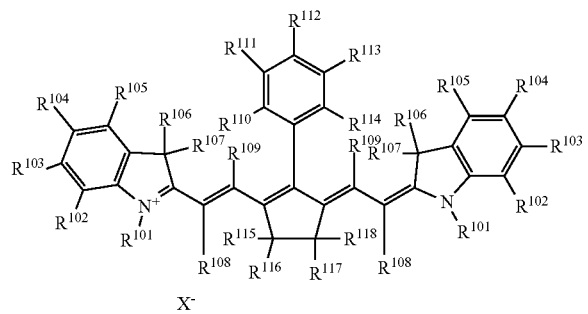

X⁻

In Formulae (III-1) and (III-2), $R^{101}$ to $R^{114}$ and X⁻ are the same as in Formula (III). $R^{115}$ to $R^{120}$ represent, independently of each other, a hydrogen atom, a halogen atom, an alkyl group or an alkoxy group (each of them has a carbon number of 1 to 15 and may include a substituent), or an aryl group having a carbon number of 5 to 20. It is preferable that $R^{115}$ to $R^{120}$ represent, independently of each other, a hydrogen atom, an alkyl group having a carbon number of 1 to 15, or an aryl group having a carbon number of 5 to 20 (it may include a chain, cyclic, or branched alkyl group), even preferably a hydrogen atom or an alkyl group having a carbon number of 1 to 15. It is preferable that $R^{115}$ to $R^{120}$ be the same group.

A compound in which n2 in Formula (IV) is 1 is represented by the following Formula (IV-1) and a compound in which n2 in Formula (IV) is 0 is represented by the following Formula (IV-2).

(IV-1)

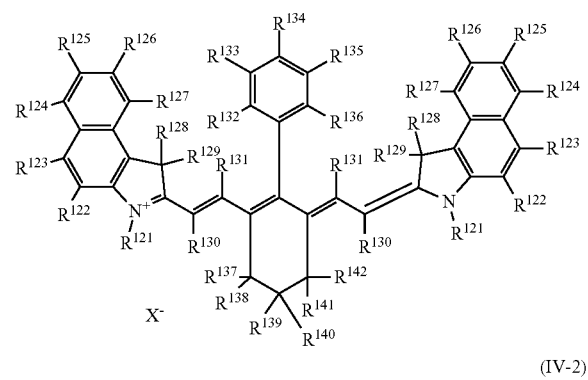

(IV-2)

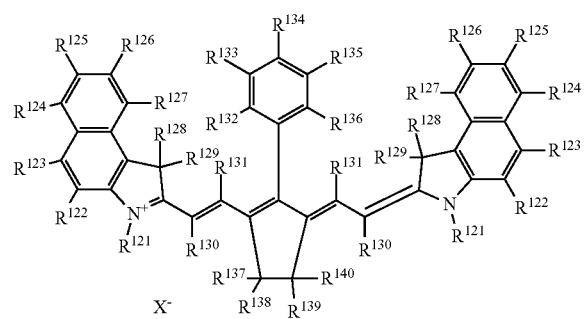

In Formulae (IV-1) and (IV-2), $R^{121}$ to $R^{136}$ and X⁻ are the same as in Formula (IV). $R^{137}$ to $R^{142}$ represent, independently of each other, a hydrogen atom, a halogen atom, an alkyl group or an alkoxy group (each of them has a carbon number of 1 to 15 and may include a substituent), or an aryl group having a carbon number of 5 to 20. It is preferable that $R^{137}$ to $R^{142}$ be, independently of each other, a hydrogen atom, an alkyl group having a carbon number of 1 to 15, or an aryl group having a carbon number of 5 to 20 (it may include a chain, cyclic, or branched alkyl group), even preferably a hydrogen atom or an alkyl group having a carbon number of 1 to 15. It is preferable that $R^{137}$ to $R^{142}$ be the same group.

More specific examples of the compounds represented by Formulae (III-1), (III-2), (IV-1), or (IV-2) include compounds in each of which the atoms and groups connected to the framework are atoms or groups shown in the following tables. In all compounds shown in the following tables, $R^{101}$ to $R^{109}$ located in the left portion of each formula are the same as those located in its right portion. In all compounds shown in the following tables, $R^{121}$ to $R^{131}$ located in the left portion of each formula are the same as those located in its right portion.

"$R^{110}$-$R^{114}$" in the following tables and "$R^{132}$-$R^{136}$" in the following tables represent atoms or groups that are connected to the central benzene ring in each formula. In the case where all of five symbols represent hydrogen atoms, "H" is written. In the case where one of $R^{110}$ to $R^{114}$ is a substituent and the others are hydrogen atoms, only a combination of a symbol representing that substituent and the substituents is written. For example, an entry "$R^{112}$—C(CH₃)₃" means that $R^{112}$ is —C(CH₃)₃ and the others are hydrogen atoms. The same applies to "$R^{132}$-$R^{136}$".

"$R^{115}$-$R^{120}$" in Table 4 and "$R^{137}$-$R^{142}$" in Table 6 represent atoms or groups that are connected to the central cyclohexane ring in Formulae (III-1) and (IV-1). Where all of six symbols represent hydrogen atoms, "H" is written. In the case where one of $R^{115}$ to $R^{120}$ is a substituent and the others are hydrogen atoms, only a combination of a symbol representing that substituent and the substituents is written. The same applies to "$R^{137}$-$R^{142}$".

"$R^{115}$-$R^{118}$" in Table 5 and "$R^{137}$-$R^{140}$" in Table 7 represent atoms or groups that are connected to the central cyclopentane ring in Formulae (III-2) and (IV-2). In the case where all of four symbols represent hydrogen atoms, "H" is written. In the case where one of $R^{115}$ to $R^{118}$ is a substituent and the others are hydrogen atoms, only a combination of a symbol representing that substituent and the substituents is written. The same applies to "$R^{137}$-$R^{140}$".

What are represented by X⁻ are not shown in the following tables, but X⁻ is $BF_4^-$ or $PF_6^-$ in each compound.

TABLE 4

| Dye symbol | $R^{101}$ | $R^{102}$ | $R^{103}$ | $R^{104}$ | $R^{105}$ | $R^{106}$ | $R^{107}$ | $R^{108}$ | $R^{109}$ | $R^{110}$-$R^{114}$ | $R^{115}$-$R^{120}$ |
|---|---|---|---|---|---|---|---|---|---|---|---|
| (III-1-1) | —CH$_3$ | H | H | H | H | —CH$_3$ | —CH$_3$ | H | H | H | H |
| (III-1-2) | —CH$_2$CH$_3$ | H | H | H | H | —CH$_3$ | —CH$_3$ | H | H | H | H |
| (III-1-3) | —CH(CH$_3$)$_2$ | H | H | H | H | —CH$_3$ | —CH$_3$ | H | H | H | H |
| (III-1-4) | -nC$_3$H$_7$ | H | H | H | H | —CH$_3$ | —CH$_3$ | H | H | H | H |
| (III-1-5) | -nC$_4$H$_9$ | H | H | H | H | —CH$_3$ | —CH$_3$ | H | H | H | H |
| (III-1-6) | —CH$_3$ | H | H | H | H | H | H | H | H | H | H |
| (III-1-7) | —CH$_2$CH$_3$ | H | H | H | H | H | H | H | H | H | H |
| (III-1-8) | —CH(CH$_3$)$_2$ | H | H | H | H | H | H | H | H | H | H |
| (III-1-9) | -nC$_3$H$_7$ | H | H | H | H | H | H | H | H | H | H |
| (III-1-10) | -nC$_4$H$_9$ | H | H | H | H | H | H | H | H | H | H |

Among the examples of the dye (III-1), the dyes (III-1-1) to (III-1-5) etc. are preferable from the viewpoints of transparency in a visible range and solubility in a resin.

TABLE 5

| Dye symbol | $R^{101}$ | $R^{102}$ | $R^{103}$ | $R^{104}$ | $R^{105}$ | $R^{106}$ | $R^{107}$ | $R^{108}$ | $R^{109}$ | $R^{110}$-$R^{114}$ | $R^{115}$-$R^{118}$ |
|---|---|---|---|---|---|---|---|---|---|---|---|
| (III-2-1) | —CH$_3$ | H | H | H | H | —CH$_3$ | —CH$_3$ | H | H | H | H |
| (III-2-2) | —CH$_2$CH$_3$ | H | H | H | H | —CH$_3$ | —CH$_3$ | H | H | H | H |
| (III-2-3) | —CH(CH$_3$)$_2$ | H | H | H | H | —CH$_3$ | —CH$_3$ | H | H | H | H |
| (III-2-4) | -nC$_3$H$_7$ | H | H | H | H | —CH$_3$ | —CH$_3$ | H | H | H | H |
| (III-2-5) | -nC$_4$H$_9$ | H | H | H | H | —CH$_3$ | —CH$_3$ | H | H | H | H |
| (III-2-6) | —CH$_3$ | H | H | H | H | H | H | H | H | H | H |
| (III-2-7) | —CH$_2$CH$_3$ | H | H | H | H | H | H | H | H | H | H |
| (III-2-8) | —CH(CH$_3$)$_2$ | H | H | H | H | H | H | H | H | H | H |
| (III-2-9) | -nC$_3$H$_7$ | H | H | H | H | H | H | H | H | H | H |
| (III-2-10) | -nC$_4$H$_9$ | H | H | H | H | H | H | H | H | H | H |

Among the examples of the dye (III-2), the dyes (III-2-1) to (I-2-5) etc. are preferable from the viewpoints of transparency in a visible range and solubility in a resin.

TABLE 6

| Dye symbol | $R^{121}$ | $R^{122}$-$R^{127}$ | $R^{128}$ | $R^{129}$ | $R^{130}$ | $R^{131}$ | $R^{132}$-$R^{136}$ | $R^{137}$-$R^{142}$ |
|---|---|---|---|---|---|---|---|---|
| (IV-1-1) | —CH$_3$ | H | —CH$_3$ | —CH$_3$ | H | H | H | H |
| (IV-1-2) | —CH$_2$CH$_3$ | H | —CH$_3$ | —CH$_3$ | H | H | H | H |
| (IV-1-3) | —CH(CH$_3$)$_2$ | H | —CH$_3$ | —CH$_3$ | H | H | H | H |
| (IV-1-4) | -nC$_3$H$_7$ | H | —CH$_3$ | —CH$_3$ | H | H | H | H |
| (IV-1-5) | -nC$_4$H$_9$ | H | —CH$_3$ | —CH$_3$ | H | H | H | H |
| (IV-1-6) | —CH$_3$ | H | H | H | H | H | H | H |
| (IV-1-7) | —CH$_2$CH$_3$ | H | H | H | H | H | H | H |
| (IV-1-8) | —CH(CH$_3$)$_2$ | H | H | H | H | H | H | H |
| (IV-1-9) | -nC$_3$H$_7$ | H | H | H | H | H | H | H |
| (IV-1-10) | -nC$_4$H$_9$ | H | H | H | H | H | H | H |

Among the examples of the dye (IV-1), the dyes (IV-1-1) to (IV-1-5) etc. are preferable from the viewpoints of transparency in a visible range and solubility in a resin.

TABLE 7

| Dye symbol | $R^{121}$ | $R^{122}$-$R^{127}$ | $R^{128}$ | $R^{129}$ | $R^{130}$ | $R^{131}$ | $R^{132}$-$R^{136}$ | $R^{137}$-$R^{140}$ |
|---|---|---|---|---|---|---|---|---|
| (IV-2-1) | —CH$_3$ | H | —CH$_3$ | —CH$_3$ | H | H | H | H |
| (IV-2-2) | —CH$_2$CH$_3$ | H | —CH$_3$ | —CH$_3$ | H | H | H | H |
| (IV-2-3) | —CH(CH$_3$)$_2$ | H | —CH$_3$ | —CH$_3$ | H | H | H | H |
| (IV-2-4) | -nC$_3$H$_7$ | H | —CH$_3$ | —CH$_3$ | H | H | H | H |
| (IV-2-5) | -nC$_4$H$_9$ | H | —CH$_3$ | —CH$_3$ | H | H | H | H |

TABLE 7-continued

| Dye symbol | Substituent | | | | | | | |
|---|---|---|---|---|---|---|---|---|
| | $R^{121}$ | $R^{122}$-$R^{127}$ | $R^{128}$ | $R^{129}$ | $R^{130}$ | $R^{131}$ | $R^{132}$-$R^{136}$ | $R^{137}$-$R^{140}$ |
| (IV-2-6) | —CH$_3$ | H | H | H | H | H | H | H |
| (IV-2-7) | —CH$_2$CH$_3$ | H | H | H | H | H | H | H |
| (IV-2-8) | —CH(CH$_3$)$_2$ | H | H | H | H | H | H | H |
| (IV-2-9) | -nC$_3$H$_7$ | H | H | H | H | H | H | H |
| (IV-2-10) | -nC$_4$H$_9$ | H | H | H | H | H | H | H |

Among the examples of the dye (IV-2), the dyes (IV-2-1) to (IV-2-5) etc. are preferable from the viewpoints of transparency in a visible range and solubility in a resin.

The dyes (III) and (IV) are different from each other in framework as described above and hence in a wavelength range of local maximum absorption. In the dye (III), a maximum absorption wavelength is located approximately in a wavelength of 760 to 830 nm though it depends on the combination of the kinds and the combination of atoms and groups connected to the framework. In the dye (IV), a maximum absorption wavelength is located approximately in a wavelength of 800 to 900 nm though it depends on the kinds and the combination of atoms and groups connected to the framework.

Furthermore, in the dye (III), maximum absorption wavelengths in cases that n1 of the framework is 1 and 0, respectively, are different from each other. A maximum absorption wavelength is located approximately in a wavelength of 760 to 800 nm in the case where n1 is 1 and approximately in a wavelength of 800 to 830 nm in the case where n1 is 0 though it depends on the kinds and the combination of atoms and groups connected to the framework.

Likewise, in the dye (IV), maximum absorption wavelengths in cases that n2 is 1 and 0, respectively, are different from each other. A maximum absorption wavelength is located approximately in a wavelength of 800 to 830 nm in the case where n2 is 1 and approximately in a wavelength of 830 to 900 nm in the case where n2 is 0 though it depends on the kinds and the combination of atoms and groups connected to the framework (IV-1).

The dyes (III) and (IV) can be manufactured by, for example, methods described in Dyes and Pigments, 73 (2007), pp. 344-352 and J. Heterocyclic Chem., 42, 959 (2005).

<Cyanine Compound (V)>

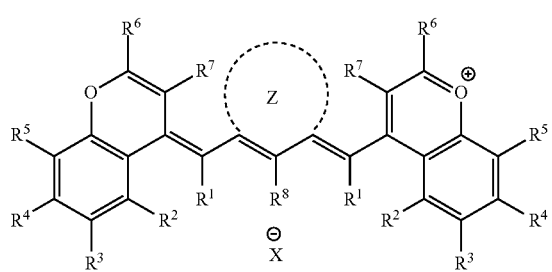

(V)

Symbols in Formula (V) have the following meanings.

$R^1$ to $R^7$ represent, independently of each other, a hydrogen atom, a halogen atom, a sulfo group, a hydroxyl group, a cyano group, a nitro group, a carboxy group, a phosphate group, an alkyl group having a carbon number of 1 to 10 that may include a substituent, an alkoxy group having a carbon number of 1 to 10 that may include a substituent, or an acyloxy group having a carbon number of 1 to 10 that may include a substituent.

In Formula (V), $R^1$ to $R^7$ located in the left portion of the formula may be either the same as or different from those located in its right portion, but it is preferable that all of them located in the left portion of the formula be the same as those located in its right portion.

Examples substitutes that may be included in the alkyl group, alkoxy group, and acyloxy group each of which has a carbon number of 1 to 10 and may include a substituent include a halogen atom and an alkoxy group having a carbon number of 1 to 10.

In this connection, in this specification, unless otherwise specified, an alkyl group may be linear, branched, cyclic, or of a structure that is a combination of those structures. The same is true of an alkyl group included in an alkoxy group. Example halogen atoms include a fluorine atom, a chlorine atom, a bromine atom, and an iodine atom, preferably a fluorine atom and a chlorine atom.

From the viewpoint of the ease of synthesis etc., it is preferable that each of $R^1$ be, independently of each other, a hydrogen atom, a halogen atom, a hydroxyl group, or an alkyl group, an alkoxy group, or an acyloxy group (each of them has a carbon number of 1 to 10), particularly preferably a hydrogen atom.

It is preferable that $R^2$ to $R^7$ be, independently of each other, a hydrogen atom, a halogen atom, a hydroxyl group, an alkyl group having a carbon number of 1 to 10 that may include a substitute, an alkoxy group having a carbon number of 1 to 10 that may include a substitute, or an acyloxy group having a carbon number of 1 to 10 that may include a substitute. From the viewpoint of the ease of synthesis etc., it is preferable that they be, independently of each other, a hydrogen atom, an alkyl group having a carbon number of 1 to 10, or an alkoxy group having a carbon number of 1 to 10 that may include a substitute.

From the viewpoint of solubility in a resin or a solvent, it is preferable that at least one of $R^6$ and $R^7$ be an alkyl group having a carbon number of 1 to 10, even preferably a secondary or tertiary branched alkyl group having a carbon number of 10 or smaller and further preferably a tertiary butyl group, an isopropyl group, and an isobutyl group.

Adjacent two of $R^2$ to $R^5$ or $R^6$ and $R^7$ may connect to each other to form a 5 to 8-membered ring. The ring may be an aliphatic one or an aromatic one.

Formula (V) includes Z optionally. The Z is a 5-membered ring or a 6-membered ring. Inclusion of the Z is preferable from the viewpoint of durability. It is noted that a hydrogen atom that is connected to a carbon atom included in the Z may be replaced by an alkyl group having a carbon number of 1 to 10 or an aryl group having a carbon number of 6 to 10.

In this specification, unless otherwise specified, the term "aryl group" means a group that is connected via a carbon atom that is a member of an aromatic ring of an aromatic compound, such as a benzene ring, a naphthalene ring, biphenyl, a furan ring, a thiophene ring, or a pyrrole ring.

$X^-$ represents a monovalent anion.

It is preferable that $X^-$ represent $PF_6^-$, $[Rf-SO_2]^-$, $[N(Rf-SO_2)_2]^-$, or $BF_4^-$. Rf represents an alkyl group with replacement by at least one fluorine atom, preferably a perfluoroalkyl group having a carbon number of 1 to 8 and particularly preferably $-CF_3$. With the anion having such a structure, a dye compound (V) that is high in light resistance can be obtained.

RR represents a hydrogen atom, a halogen atom, or $-Y^5-R^{10}$ ($Y^5$ represents a single bond, an ether bond ($-O-$), a sulfonyl bond ($-SO_2-$), an ester bond ($-C(=O)-O-$ or $-O-C(=O)-$), or a ureido bond ($-NH-C(=O)-NH-$). $R^{10}$ represents an alkyl group having a carbon number of 1 to 20 that may include a substituent or an aryl group having a carbon number of 6 to 30).

It is preferable that $R^8$ represent a hydrogen atom, a halogen atom, or $-Y^5-R^{10}$ in which $Y^5$ is a single bond, even preferably a hydrogen atom, a chlorine atom, an alkyl group having a carbon number of 1 to 10, or an aryl group having a carbon number of 1 to 6 that may be replaced by a halogen atom.

More specific example of the compound represented by Formula (V) include compounds in which atoms and compounds connected to the framework are shown in the following table. In all of the compounds shown in the following table, $R^1$ to $R^7$ located in the left portion of each formula are the same as those located in its right portion.

TABLE 8

| Dye symbol | $R^1$ | $R^2$ | $R^3$ | $R^4$ | $R^5$ | $R^6$ | $R^7$ | $R^8$ | Z | $X^-$ |
|---|---|---|---|---|---|---|---|---|---|---|
| (V-1) | H | H | H | H | H | $-C(CH_3)_3$ | H | H | — | $BF_4^-$ |
| (V-2) | H | H | H | H | H | $-C(CH_3)_3$ | H | H | — | $PF_6^-$ |
| (V-3) | H | H | H | H | H | $-C(CH_3)_3$ | H | H | — | $N(SO_2CF_3)_2^-$ |
| (V-4) | H | H | H | H | H | $-C(CH_3)_3$ | H | H | — | $SO_2CF_3^-$ |
| (V-5) | H | H | H | H | H | $-C(CH_3)_3$ | H | $-CH_3$ | — | $BF_4^-$ |
| (V-6) | H | H | H | H | H | $-C(CH_3)_3$ | H | $-CH_3$ | — | $PF_6^-$ |
| (V-7) | H | H | H | H | H | $-C(CH_3)_3$ | H | $-CH_3$ | — | $N(SO_2CF_3)_2^-$ |
| (V-8) | H | H | H | H | H | $-C(CH_3)_3$ | H | $-CH_3$ | — | $SO_2CF_3^-$ |
| (V-9) | H | H | H | H | H | $-C(CH_3)_3$ | H | Ph | — | $BF_4^-$ |
| (V-10) | H | H | H | H | H | $-C(CH_3)_3$ | H | Ph | — | $PF_6^-$ |
| (V-11) | H | H | H | H | H | $-C(CH_3)_3$ | H | Ph | — | $N(SO_2CF_3)_2^-$ |
| (V-12) | H | H | H | H | H | $-C(CH_3)_3$ | H | Ph | — | $SO_2CF_3^-$ |
| (V-13) | H | H | $-C(CH_3)_3$ | H | H | $-C(CH_3)_3$ | H | H | — | $BF_4^-$ |
| (V-14) | H | H | $-C(CH_3)_3$ | H | H | $-C(CH_3)_3$ | H | H | — | $PF_6^-$ |
| (V-15) | H | H | $-C(CH_3)_3$ | H | H | $-C(CH_3)_3$ | H | H | — | $N(SO_2CF_3)_2^-$ |
| (V-16) | H | H | $-C(CH_3)_3$ | H | H | $-C(CH_3)_3$ | H | H | — | $SO_2CF_3^-$ |
| (V-17) | H | H | $-OCH_3$ | H | H | $-C(CH_3)_3$ | H | H | — | $BF_4^-$ |
| (V-18) | H | H | $-OCH_3$ | H | H | $-C(CH_3)_3$ | H | H | — | $PF_6^-$ |
| (V-19) | H | H | $-OCH_3$ | H | H | $-C(CH_3)_3$ | H | H | — | $N(SO_2CF_3)_2^-$ |
| (V-20) | H | H | $-OCH_3$ | H | H | $-C(CH_3)_3$ | H | H | — | $SO_2CF_3^-$ |
| (V-21) | H | H | H | $-C(CH_3)_3$ | H | $-C(CH_3)_3$ | H | H | — | $BF_4^-$ |
| (V-22) | H | H | H | $-C(CH_3)_3$ | H | $-C(CH_3)_3$ | H | H | — | $PF_6^-$ |
| (V-23) | H | H | H | $-C(CH_3)_3$ | H | $-C(CH_3)_3$ | H | H | — | $N(SO_2CF_3)_2^-$ |
| (V-24) | H | H | H | $-C(CH_3)_3$ | H | $-C(CH_3)_3$ | H | H | — | $SO_2CF_3^-$ |
| (V-25) | H | H | H | $-OCH_3$ | H | $-C(CH_3)_3$ | H | H | — | $BF_4^-$ |
| (V-26) | H | H | H | $-OCH_3$ | H | $-C(CH_3)_3$ | H | H | — | $PF_6^-$ |
| (V-27) | H | H | H | $-OCH_3$ | H | $-C(CH_3)_3$ | H | H | — | $N(SO_2CF_3)_2^-$ |
| (V-28) | H | H | H | $-OCH_3$ | H | $-C(CH_3)_3$ | H | H | — | $SO_2CF_3^-$ |
| (V-29) | H | H | H | H | H | $-C(CH_3)_3$ | H | H | $-(CH_2)_2-$ | $BF_4^-$ |
| (V-30) | H | H | H | H | H | $-C(CH_3)_3$ | H | H | $-(CH_2)_2-$ | $PF_6^-$ |
| (V-31) | H | H | H | H | H | $-C(CH_3)_3$ | H | H | $-(CH_2)_2-$ | $N(SO_2CF_3)_2^-$ |
| (V-32) | H | H | H | H | H | $-C(CH_3)_3$ | H | H | $-(CH_2)_2-$ | $SO_2CF_3^-$ |
| (V-33) | H | H | H | H | H | $-C(CH_3)_3$ | H | H | $-(CH_2)_3-$ | $BF_4^-$ |
| (V-34) | H | H | H | H | H | $-C(CH_3)_3$ | H | H | $-(CH_2)_3-$ | $PF_6^-$ |
| (V-35) | H | H | H | H | H | $-C(CH_3)_3$ | H | H | $-(CH_2)_3-$ | $N(SO_2CF_3)_2^-$ |
| (V-36) | H | H | H | H | H | $-C(CH_3)_3$ | H | H | $-(CH_2)_3-$ | $SO_2CF_3^-$ |

Among the above examples of the compound (V), the compounds (V-1) to (V-4) etc. are preferable from the viewpoints of transparency in a visible range and solubility in a resin.

As for a manufacturing method of the compound (V), a manufacturing method of the compound (V1) in which $R^1$ to $R^5$ and $R^7$ of the compound (V) are hydrogen atoms and X of the compound (V) is $BF_4^-$ will be described. However, the manufacturing method of the compound (V1) is not limited to it.

A path for obtaining the compound (VI) is shown below.

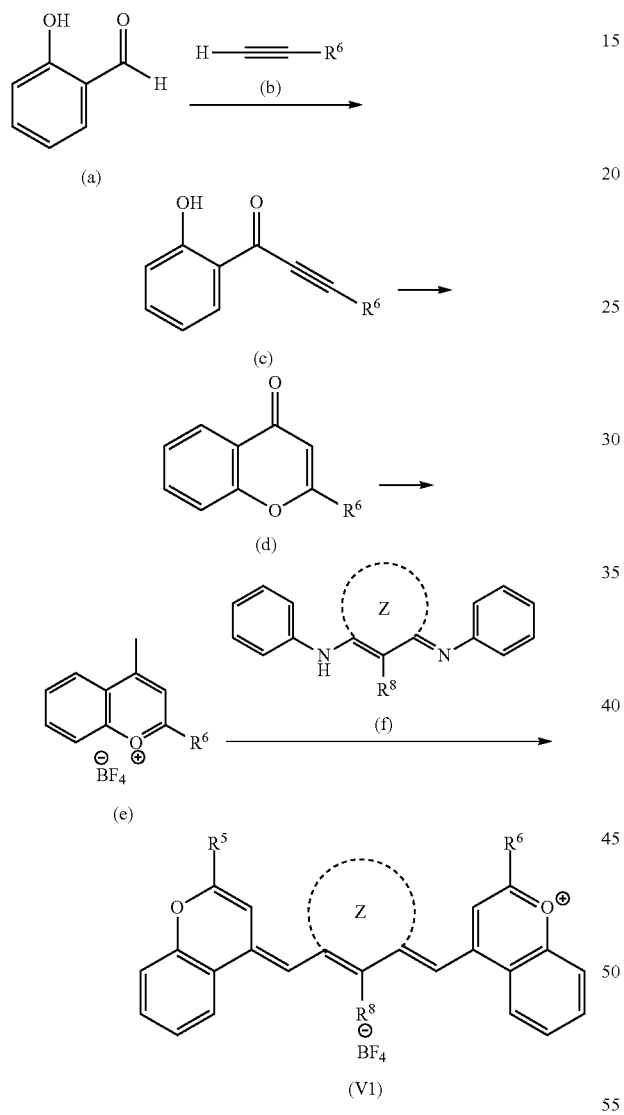

(1) A compound (c) is obtained by causing salicylaldehyde (a) and an alkyne compound (b) having an $R^6$ group to react with each other.

(2) A compound (d) is obtained by causing the compound (c) and 4-dimethylaminopyridine to react with each other.

(3) A compound (e) is obtained by causing the compound (d) to react with methylmagnesium bromide and tetrafluoroboric acid.

(4) A compound (VI) is obtained by causing the compound (e) to react with aldehyde dianilide hydrochloride (f) having an $R^8$ group.

To have $PF_6^-$ as $X^-$, synthesis can be made by using hexafluorophosphoric acid in place of tetrafluoroboric acid in the above step (3). To have $[Rf—SO_2]^-$ as $X^-$, synthesis can be made by using $Rf—SO_3H$ in place of tetrafluoroboric acid in the above step (3). To have $[N(Rf—SO_2)_2]^-$ as $X^-$, synthesis can be made by using $NH(Rf—SO_2)_2$ in place of tetrafluoroboric acid in the above step (3).

<Cyanine Compound (VI)>

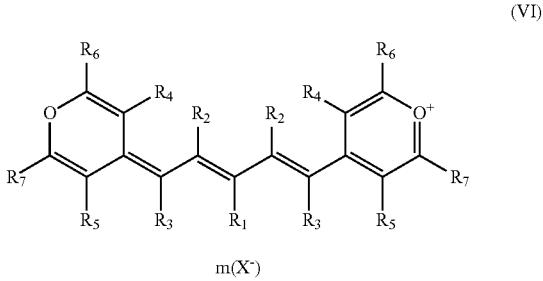

Symbols in Formula (VI) have the following meanings.

$X^-$ represents a monovalent anion. Examples of the monovalent anion species include $PF_6^-$, $BF_4^-$, $N(SO_2CF_3)_2^-$, $CF_3SO_3^-$, $ReO_4^-$, $ClO_4^-$, $Cl^-$, $Br^-$, $I^-$, $BPh_4^-$, $B(C_6F_5)_4^-$, $CF_3COO^-$, $C(SO_2CF_3)_3^-$, and p-toluenesulfonyl anion.

Ph means a phenyl group.

Among the above examples, from the viewpoint of enhancing the light resistance of the compound (VI), it is preferable that $X^-$ be what is selected from $PF_6^-$, $BF_4^-$, and $N(SO_2CF_3)_2^-$. Character m represents 0 or 1, preferably 1.

In the case where m is 0, $R^1$ represents a monovalent anionic group. Examples of the monovalent anionic group include an anionic group represented by one of (C1) to (C6) shown below.

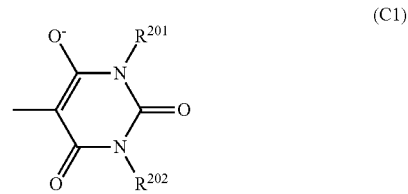

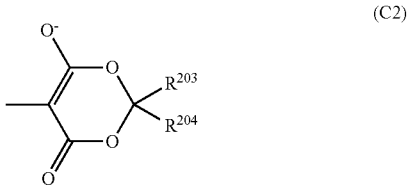

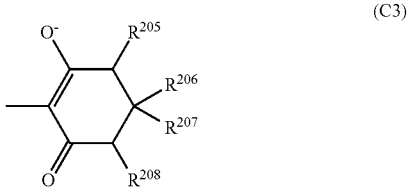

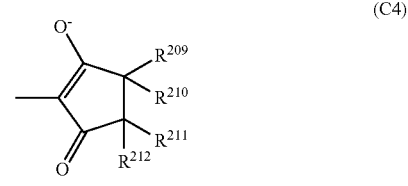

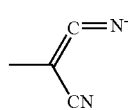

(C5)

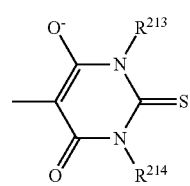

(C6)

In Formulae (C1) to (C6), $R^{201}$ to $R^{214}$ represent, independently of each other, a hydrogen atom, an aryl group having a carbon number of 5 to 20, or an alkyl group having a carbon number of 1 to 10 that may include a substituent. Examples of the substituent include a hydrogen atom and an alkoxy group having a carbon number of 1 to 10.

In the case where m is 1, $R_1$ represents a hydrogen atom, a halogen atom, an alkyl group having a carbon number of 1 to 12, an aryl group having a carbon number of 6 to 12 that may include a substituent, or an alaryl group having a carbon number of 7 to 13 that may include a substituent, or —$NR_9R_{10}$.

Examples of the halogen atom as $R_1$ include a fluorine atom, a chlorine atom, a bromine atom, and an iodine atom.

It is preferable that the carbon number of the alkyl group as $R_1$ be 1 to 10, even preferably 1 to 6. Examples of the alkyl group having a carbon number of 1 to 6 include a methyl group, an ethyl group, a propyl group, an isopropyl group, an isobutyl group, and a tert-butyl group.

Among these examples, a methyl group is particularly preferable from the viewpoint relating to synthesis.

Examples of the aryl group having a carbon number of 6 to 12 as $R_1$ include groups that are connected via a carbon atom that is a member of an aromatic ring (e.g., benzene ring, naphthalene ring, biphenyl, furan ring, thiophen ring, or pyrrole ring) of an aromatic compound.

Among these examples, a phenyl group is preferable from the viewpoint of not lowering a blue band transmittance.

Examples of the alaryl group having a carbon number of 7 to 13 as $R_1$ include a linear or branched, saturated or unsaturated hydrocarbon group that may include a saturated ring structure and a saturated cyclic hydrocarbon group, with replacement by one or more aryl groups.

Among the above examples, an alaryl group having a phenyl group is preferable from the viewpoint of not lowering a blue band transmittance.

Examples of the substitute that may be included in $R_1$ include a halogen atom (a fluorine atom, a chlorine atom, a bromine atom, and an iodine atom), an alkyl group having a carbon number of 1 to 12, an alkoxy group having a carbon number of 1 to 12, a hydroxyl group, a carboxy group, a sulfo group, a cyano group, an amino group, an N-substituted amino group, a nitro group, an alkoxycarbonyl group, a carbamoyl group, an N-substituted carbamoyl group, and an imide group.

$R_9$ and $R_{10}$ represent, independently of each other, an alkyl group having a carbon number of 1 to 12, an aryl group having a carbon number of 6 to 12 that may include a substituent, or a carbonyl group having a carbon number of 1 to 12 that may include a substituent.

Specific examples of the alkyl group and aryl group as $R_9$ and $R_{10}$ and specific examples of the substituent that $R_9$ and $R_{10}$ may include are the same as those as or of $R^1$.

Examples of the carbonyl group having a carbon number of 1 to 12 as $R_9$ and $R_{10}$ include an acetyl group, an ethanoyl group, a propanoyl group, a benzoyl group, a trifluoroacetyl group, and pentafluoroethanoyl group.

Among these examples of RI, from the viewpoint of not lowering a blue band transmittance and a viewpoint relating to synthesis, a hydrogen atom, a methyl group, a phenyl group, a diphenylamino group, an N-ethylamide group, and an N-ethyl-2, 2, 2-trifluoroacetamide group are preferable, even preferably a hydrogen atom, a methyl group, and a phenyl group.

$R_2$ to $R_7$ represent, independently of each other, a hydrogen atom, a halogen atom, an alkyl group having a carbon number of 1 to 12, a cycloalkyl group having a carbon number of 3 to 12, an aryl group having a carbon number of 6 to 12 that may include a substituent, or an alaryl group having a carbon number of 7 to 13 that may include a substituent. Adjacent two of $R_2$ to $R_7$ may connect to each other to form a 5 to 8-membered ring.

The halogen atom, alkyl group, aryl group having a carbon number of 6 to 12, and alaryl group as specific examples of $R_2$ to $R_7$ and specific examples of the substituent that may be a member of $R_2$ to $R_7$ are the same as the specific examples of those of $R_1$.

It is preferable that the carbon number of the cycloalkyl group as $R_2$ to $R_7$ be 3 to 10, even preferably 6 to 10. Examples of the cycloalkyl group having a carbon number of 6 to 10 include a cyclohexyl group, a cycloheptyl group, a cyclooctyl group, and an adamantyl group.

Among these examples, from the viewpoint of not lowering a blue band transmittance and a viewpoint relating to synthesis, it is preferable that $R_2$ to $R_5$ be a hydrogen atom or an alkyl group having a carbon number of 1 to 12, even preferably a hydrogen atom.

From the viewpoint of increasing a blue band transmittance, $R_6$ and $R_7$ is preferably an alkyl group having a carbon number of 1 to 12 or an aryl group having a carbon number of 6 to 12 that may include a substituent, even preferably a secondary alkyl group having a carbon number of 1 to 12, a tertiary alkyl group having a carbon number of 1 to 12, or a phenyl group having a substituent at the second and sixth positions, and further preferably an isopropyl group, a tert-butyl group, a sec-butyl group, a 2, 6-dimethylphenyl group, a 2, 4, 6-trimethylphenyl group, a 2, 6-diisopropylphenyl group, and 2, 4, 6-triisopropylphenyl group.

Furthermore, it is even preferable that the compound (VI) be a compound represented by the following Formula (VI-1).

(VI-1)

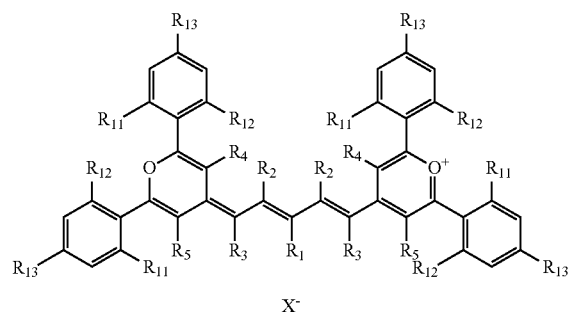

Symbols in Formula (VI-1) have the following meanings.

The definitions of $X^-$ and $R_1$ to $R_5$ are the same as in Formula (VI).

$R_{11}$ and $R_{12}$ represent, independently of each other, an alkyl group having a carbon number of 1 to 12 or an alkoxy group having a carbon number of 1 to 12.

It is preferable that the carbon number of the alkyl group as $R_{11}$ and $R_{12}$ be 1 to 8, even preferably 1 to 5. Examples of the alkyl group having a carbon number of 1 to 5 include a methyl group, an ethyl group, an isopropyl group, and a tert-butyl group.

It is preferable that the carbon number of the alkoxy group as $R_{11}$ and $R_{12}$ be 1 to 8, even preferably 1 to 6. Examples of the alkoxy group having a carbon number of 1 to 6 include a methoxy group, an ethoxy group, and an isopropoxy group.

In the case where $R_{11}$ and $R_{12}$ are an alkyl group having a carbon number of 1 to 12 or an alkoxy group having a carbon number of 1 to 12, the dye A takes a conformation that a phenyl group is perpendicular to a x conjugate plane. As a result, the x conjugation between the phenyl group and the dye A is lost, whereby the phenyl group comes to bring about an induced electron attracting effect. This electron attracting effect allows the compound (VI-1) to have an absorption in a near-infrared range of 720 to 760 nm and can increase the transmittance in a blue band.

Among the above examples of $R_{11}$ and $R_{12}$, from the viewpoint relating to synthesis, an alkyl group having a carbon number of 1 to 12 is preferable, even preferably an alkyl group having a carbon number of 1 to 5 and further preferably a methyl group, an ethyl group, and an isopropyl group.

$R_{13}$ represents a hydrogen atom, an alkyl group having a carbon number of 1 to 12, or an alkoxy group having a carbon number of 1 to 12.

It is preferable that the carbon number of the alkyl group as $R_{13}$ be 1 to 8, even preferably 1 to 5. Examples of the alkyl group having a carbon number of 1 to 5 include a methyl group, an ethyl group, an isopropyl group, and a tert-butyl group.

It is preferable that the carbon number of the alkoxy group as $R_{13}$ be 1 to 8, even preferably 1 to 6. Examples of the alkoxy group having a carbon number of 1 to 6 include a methoxy group, an ethoxy group, and an isopropoxy group.

Among the above examples of $R_{13}$, from the viewpoint relating to synthesis, an alkyl group having a carbon number of 1 to 12 is preferable, even preferably an alkyl group having a carbon number of 1 to 5 and further preferably a methyl group, an ethyl group, and an isopropyl group.

In the case where $R_{13}$ represents what is not a hydrogen atom, from the viewpoint relating to synthesis, it is preferable that $R_{13}$ be the same group as $R_{11}$ and $R_{12}$.

More specific examples of the compound (VI-1) include compounds in which atoms and groups that are connected to each framework are atoms and groups shown in the following table.

TABLE 9

| Dye symbol | $R_1$ | $R_2$ | $R_3$ | $R_4$ | $R_5$ | $R_9$ | $R_{10}$ | $R_{11}$ | $R_{12}$ | $R_{13}$ |
|---|---|---|---|---|---|---|---|---|---|---|
| (VI-1-1) | H | H | H | H | H | — | — | —$CH_3$ | —$CH_3$ | —$CH_3$ |
| (VI-1-2) | H | H | H | H | H | — | — | —$CH_3$ | —$CH_3$ | H |
| (VI-1-3) | H | H | H | H | H | — | — | —$CH(CH_3)_2$ | —$CH(CH_3)_2$ | —$CH(CH_3)_2$ |
| (VI-1-4) | H | H | H | H | H | — | — | —$CH(CH_3)_2$ | —$CH(CH_3)_2$ | H |
| (VI-1-5) | —$CH_3$ | H | H | H | H | — | — | —$CH_3$ | —$CH_3$ | —$CH_3$ |
| (VI-1-6) | —$CH_3$ | H | H | H | H | — | — | —$CH_3$ | —$CH_3$ | H |
| (VI-1-7) | —$CH_3$ | H | H | H | H | — | — | —$CH(CH_3)_2$ | —$CH(CH_3)_2$ | —$CH(CH_3)_2$ |
| (VI-1-8) | —$CH_3$ | H | H | H | H | — | — | —$CH(CH_3)_2$ | —$CH(CH_3)_2$ | H |
| (VI-1-9) | —$C_6H_5$ | H | H | H | H | — | — | —$CH_3$ | —$CH_3$ | —$CH_3$ |
| (VI-1-10) | —$C_6H_5$ | H | H | H | H | — | — | —$CH_3$ | —$CH_3$ | H |
| (VI-1-11) | —$C_6H_5$ | H | H | H | H | — | — | —$CH(CH_3)_2$ | —$CH(CH_3)_2$ | —$CH(CH_3)_2$ |
| (VI-1-12) | —$C_6H_5$ | H | H | H | H | — | — | —$CH(CH_3)_2$ | —$CH(CH_3)_2$ | H |
| (VI-1-13) | —$NR_9R_{10}$ | H | H | H | H | —$C_6H_5$ | —$C_6H_5$ | —$CH_3$ | —$CH_3$ | —$CH_3$ |
| (VI-1-14) | —$NR_9R_{10}$ | H | H | H | H | —$C_6H_5$ | —$C_6H_5$ | —$CH_3$ | —$CH_3$ | H |
| (VI-1-15) | —$NR_9R_{10}$ | H | H | H | H | —$C_6H_5$ | —$C_6H_5$ | —$CH(CH_3)_2$ | —$CH(CH_3)_2$ | —$CH(CH_3)_2$ |
| (VI-1-16) | —$NR_9R_{10}$ | H | H | H | H | —$C_6H_5$ | —$C_6H_5$ | —$CH(CH_3)_2$ | —$CH(CH_3)_2$ | H |
| (VI-1-17) | —$NR_9R_{10}$ | H | H | H | H | —$C_2H_5$ | —$COCH_3$ | —$CH_3$ | —$CH_3$ | —$CH_3$ |
| (VI-1-18) | —$NR_9R_{10}$ | H | H | H | H | —$C_2H_5$ | —$COCH_3$ | —$CH_3$ | —$CH_3$ | H |
| (VI-1-19) | —$NR_9R_{10}$ | H | H | H | H | —$C_2H_5$ | —$COCH_3$ | —$CH(CH_3)_2$ | —$CH(CH_3)_2$ | —$CH(CH_3)_2$ |
| (VI-1-20) | —$NR_9R_{10}$ | H | H | H | H | —$C_2H_5$ | —$COCH_3$ | —$CH(CH_3)_2$ | —$CH(CH_3)_2$ | H |
| (VI-1-21) | —$NR_9R_{10}$ | H | H | H | H | —$C_2H_5$ | —$COCF_3$ | —$CH_3$ | —$CH_3$ | —$CH_3$ |
| (VI-1-22) | —$NR_9R_{10}$ | H | H | H | H | —$C_2H_5$ | —$COCF_3$ | —$CH_3$ | —$CH_3$ | H |
| (VI-1-23) | —$NR_9R_{10}$ | H | H | H | H | —$C_2H_5$ | —$COCF_3$ | —$CH(CH_3)_2$ | —$CH(CH_3)_2$ | —$CH(CH_3)_2$ |
| (VI-1-24) | —$NR_9R_{10}$ | H | H | H | H | —$C_2H_5$ | —$COCF_3$ | —$CH(CH_3)_2$ | —$CH(CH_3)_2$ | H |

Among the above examples, the compound represented by (VI-1-1) or (VI-1-2) is preferable from the viewpoint of the ease of synthesis.

From the viewpoint of increasing the resistance to light of the compound (VI), it is preferable that X⁻ be selected from $PF_6^-$, $BF_4^-$, and $N(SO_2CF_3)_2^-$.

(Manufacturing Method of Compound (VI))

A manufacturing method of the compound (VI) will be described using a manufacturing method of a compound (VI-1-a) in which $R^1$ to $R^5$ of the compound (VI-1) are hydrogen atoms. However, the manufacturing method of the compound (V1) is not limited to it.

A path for obtaining the compound (V1-1-a) is shown below.

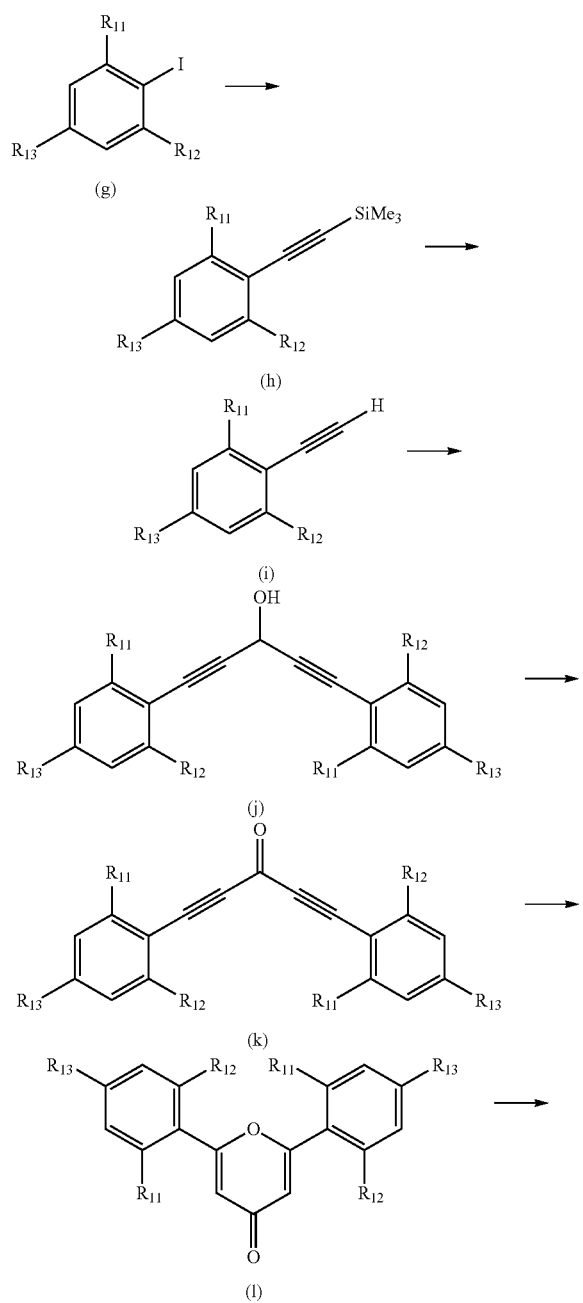

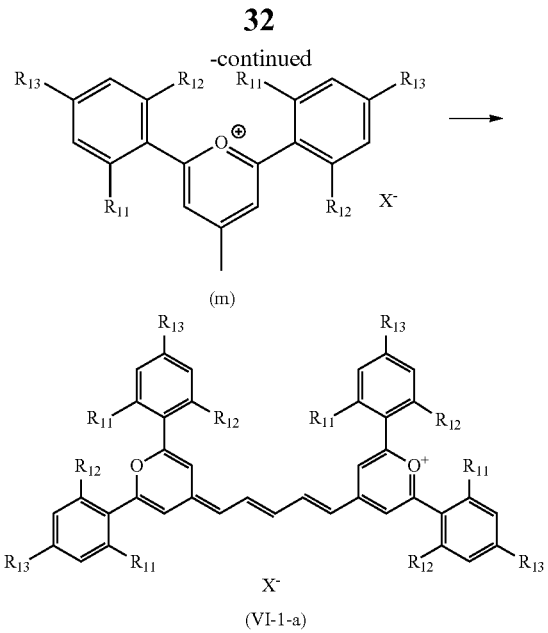

<Step 1>

A start material (g), trimethylsilylacetylene, tetrakis(triphenylphosphine) palladium (O), copper iodide, and diethylamine are put into an eggplant flask. After the inside of the flask is deaired, nitrogen replacement is made and then heating and stirring are performed. After the end of reaction, the solvent is distilled away under reduced pressure, water is added, and extraction is made using dichloromethane. The dichloromethane is distilled away under reduced pressure and refinement is performed, whereby an intermediate (h) is obtained.

<Step 2>

The intermediate (h) and methanol are put into an eggplant flask and stored in ice. Potassium carbonate is added to it and a resulting solution is stirred under a nitrogen flow. After the end of reaction, potassium carbonate is removed from the reaction system by filtering and a resulting filtrate is subjected to distillation under reduced pressure. Water is added to a resulting liquid and extraction is made using dichloromethane. The dichloromethane is distilled away under reduced pressure and refinement is performed, whereby an intermediate (i) is obtained.

<Step 3>

The intermediate (i) and tetrahydrofuran are put into an eggplant flask and stirred under a nitrogen flow. Stirring is performed after addition of n-butyllithium. Subsequently, ethyl formate dissolved in tetrahydrofuran is added and a resulting solution is stirred. After the end of reaction, the reaction is stopped by adding water and extraction is made using dichloromethane. The dichloromethane is distilled away under reduced pressure and a resulting solid is cleaned, whereby an intermediate (j) is obtained.

<Step 4>

The intermediate (j), dichloromethane, and manganese oxide are put into an eggplant flask and stirred under a nitrogen flow. After the end of reaction, manganese oxide is removed by filtering a reaction solution and a filtrate is subjected to distillation under reduced pressure. A powder obtained is cleaned, whereby an intermediate (k) is obtained.

<Step 5>

The intermediate (k), p-toluenesulfonic acid-hydrate, methanol, and toluene are put into an eggplant flask and stirred. Subsequently, the solvent is distilled away under reduced pressure, methanol and concentrated hydrochloric acid are added to a resulting substance, and stirring is performed. After the end of reaction, the reaction is stopped by storing a reaction solution in ice and then adding water to it, and extraction is made using dichloromethane. The dichloromethane is distilled away under reduced pressure, toluene and trifluoromethanesulfonic acid are added, and a resulting solution is stirred. After the end of reaction, the reaction is stopped by storing a reaction solution in ice and then adding water to it and a toluene layer is extracted. The toluene is distilled away under reduced pressure, refinement is performed, and a powder obtained is cleaned, whereby an intermediate (1) is obtained.

<Step 6>

The intermediate (1) and tetrahydrofuran are put into an eggplant flask and stirred. Methylmagnesium bromide is added to a resulting solution and heating and stirring are performed under a nitrogen flow. After the end of reaction, the reaction is stopped by pouring a reaction solution into an acidic aqueous solution of 10 mass % little by little and stirring a resulting solution. The solution is subjected to extraction using dichloromethane, a dichloromethane layer is cleaned by water, and the dichloromethane is distilled away under reduced pressure. An intermediate (m) is obtained by cleaning a powder obtained.

Examples of the acidic aqueous solution of 10 mass % include an aqueous solution of hexafluorophosphoric acid, an aqueous solution of tetrafluoroboric acid, an aqueous solution of bis(trifluoromethanesulfonyl)imide, an aqueous solution of trifluoromethanesulfonic acid, an aqueous solution of perrhenic acid, an aqueous solution of perchloric acid, an aqueous solution of hydrochloric acid, an aqueous solution of hydrobromic acid, and an aqueous solution of hydroiodic acid.

<Step 7>

The intermediate (m), malonaldehyde dianilide hydrochloride, sodium acetate, acetic acid, and acetic acid anhydride are put into an eggplant flask and heated and stirred in a nitrogen flow. After the end of reaction, a reaction solution is stored in ice and added with water. Then a reaction solution is filtered to collect a powder. The powder is refined and a solid obtained is cleaned, whereby a compound (VI-1-a) is obtained.

It is preferable that the content of the NIR dye (I) in the resin film be 0.1 to 25 parts by mass with respect to 100 parts by mass of the resin, even preferably 0.3 to 15 parts by mass. In the case where two or more kinds of compounds are combined, the above content is the sum of the respective compounds.

<Other Dyes>

The resin film may contain a dye(s) other than the NIR dye, such as a UV dye.

Specific example UV dyes include dyes of an oxazole type, a merocyanine type, a cyanine type, a naphthalimide type, an oxadiazole type, an oxazine type, an oxazolidine type, a naphthalic acid type, a styryl type, an anthracene type, a cyclic carbonyl type, and a triazole type. One kind of UV dye may be used singly and two or more kinds of UV dyes may be used in combination.

<Substrate Structure>

The substrate of the present filter may have either a single-layer structure or a multilayer structure. There are no particular limitations on the material of the substrate; the material may be either an organic material or an inorganic material as long as it is a transparent material that transmits visible light in a range of 400 to 700 nm.

In the case where the substrate has a single-layer structure, it is preferable that the substrate be a resin substrate that is a resin film containing a resin and the NIR dye (I).

In the case where the substrate has a multilayer structure, it is preferable that the substrate be a composite substrate in which a resin film containing the NIR dye (1) is laid on at least one major surface of a support body. In this case, it is preferable that the support body be made of a transparent resin or a transparent inorganic material.

There are no particular limitations on the resin type except that it should be a transparent resin. One or more transparent resins selected from a polyester resin, an acrylic resin, an epoxy resin, an en thiol resin, a polycarbonate resin, a polyether resin, a polyarylate resin, a polysulfone resin, a polyether sulfone resin, a polyparaphenylene resin, a polyarylene ether phosphine oxide resin, a polyamide resin, a polyimide resin, a polyamideimide resin, a polyolefin resin, a cyclic olefin resin, a polyurethane resin, a polystyrene resin, etc. are used. One of these kinds of resins may be used singly and two or more kinds of them may be used in mixture.

One or more kinds of resins selected from a polyimide resin, a polycarbonate resin, a polyether resin, and an acrylic resin are preferable from the viewpoints of the spectroscopic characteristics, glass transition temperature (Tg), and adhesion of the resin film.

In the case where plural compounds are used as the NIR dye (I) and other dyes, they may be contained in either the same resin film or different resin films, respectively.

Preferable example of the transparent inorganic materials include glass and a crystal material.

Examples of the glass that can be used as the support body include an absorption glass (a near-infrared light absorption glass) in which copper ions are contained in a fluorophosphate glass, a phosphate glass, or the like, a soda-lime glass, a borosilicate glass, an alkali-free glass, and a quartz glass.

A chemically strengthened glass obtained by replacing alkali metal ions having a small ion radius (e.g., Li ions and/or Na ions) that exist adjacent to a major surface of a glass plate with alkali ions having a larger ion radius (e.g., Na ions or K ions for Li ions and K ions for Na ions) by an ion exchange at a temperature that is lower than or equal to a glass transition temperature may be used as the glass.

Examples of crystal materials that can be used to form the support body include birefringent crystals such as quartz, lithium niobate, and sapphire.

From the viewpoints of the shape stability that relates to the long-term reliability of optical characteristics, mechanical properties, etc. and the ease of handling during filter manufacture, it is preferable that the support body be made of an inorganic material, particularly preferably glass or sapphire.

The resin film can be formed by preparing a coating liquid by dissolving or dispersing, in a solvent, the dye (I), a resin or resin material components, and components that are mixed when necessary, applying it to the support body and drying it, and, if necessary, curing it. The support body may be either one included in the present filter or a peelable one that is used only in forming the resin film. It suffices that the solvent be a dispersion medium that enables stable dispersion or a solvent capable of dissolution.

The coating liquid may contain a surfactant to improve voids formed by minute babbles, depressions due to sticking of foreign substances etc., and cissing in a drying step, and other things. The coating liquid can be applied by, for example, an immersion coating method, a cast coating method, or a spin coating method. The resin film is formed by applying the above-mentioned coating liquid to the support body and then drying it. In the case where the coating liquid contains material components of a transparent resin, a curing treatment such as thermal curing or photo-curing is performed further.

The resin film can also be manufactured so as to have a film shape by extrusion molding. In the case where the substrate has a single-layer structure that is made up of a resin film containing the dye (I) (resin substrate), the resin film itself can be used as the substrate. In the case where the substrate has a multilayer structure containing the support body and a resin film containing the dye (I) and laid on at least one major surface of the support body (composite substrate), the substrate can be manufactured by laying such a film on the support body and integrating it with the support body by, for example, thermocompression bonding.

The optical filter may have either one resin film or two or more resin films. In the case where the optical filter has two or more resin films, the resin films may have either the same structure or different structures.

In the case where the substrate has a single-layer structure that is made up of a resin film containing the dye (I) (resin substrate), it is preferable that the thickness of the resin film be 20 to 150 µm.

In the case where the substrate has a multilayer structure containing the support body and a resin film containing the dye (I) and laid on at least one major surface of the support body (composite substrate), it is preferable that the thickness of the resin film be 0.3 to 20 µm. In the case where the optical filter has resin films in the form of two or more layers, it is preferable that the total thickness of the resin films be in the above range.

There are no particular limitations on the shape of the substrate; it may have a block shape, a plate shape, or a film shape.

Furthermore, from the viewpoints of reduction of a warp that may occur at the time of formation of a dielectric multilayer film and height reduction of an optical device, it is preferable that the thickness of the substrate be 300 µm or smaller. In the case where the substrate is a resin substrate that is made up of a resin film, it is preferable that the thickness of the substrate be 50 to 300 µm. In the case where the substrate is a composite substrate including the support body and a resin film, it is preferable that the thickness of the substrate be 50 to 300 µm.

For example, the present filter may be equipped with, as another constituent element, a constituent element (layer) that gives absorption by, for example, inorganic fine particles for controlling the transmission and absorption of light in a particular wavelength range. Specific examples of the inorganic fine particles include ITO (indium tin oxide), ATO (antimony-doped tin oxide), cesium tungstate, and lanthanum boride. ITO fine particles and cesium tungstate fine particles are high in visible light transmittance and light-absorptive in a wide infrared wavelength longer than 1,200 nm, and hence can be used in a case of requiring blocking of such infrared light.

<Dielectric Multilayer Film>

In the present filter, the dielectric multilayer film is laid on or above at least one major surface of the substrate as an outermost layer.

It is preferable that the dielectric multilayer film satisfy all of the following spectroscopic characteristics (iv-1) to (iv-6):

(iv-1) an average transmittance $T_{450\text{-}600AVE}$ in a wavelength of 450 to 600 nm is 93% or higher;

(iv-2) in a wavelength of 600 to 800 nm, a wavelength VL50 at which a transmittance is 50% is in a wavelength of 680 to 750 nm;

(iv-3) an average transmittance $T_{750\text{-}900AVE}$ in a wavelength of 750 to 900 nm is 10% or lower;

(iv-4) in a wavelength of 850 to 950 nm, a wavelength $IR50_{850\text{-}950}$ at which a transmittance is 50% is in a wavelength of 900 to 930 nm;

(iv-5) an average transmittance $T_{930\text{-}950AVE}$ in a wavelength of 930 to 950 nm is 80% or higher; and (iv-6) in a wavelength of 950 to 1,100 nm, a wavelength $IR50_{950\text{-}1100}$ at which a transmittance is 50% is in a wavelength of 1,000 to 1,080 nm.

The satisfaction of the spectroscopic characteristic (iv-1) means that the transparency is high in a visible range. It is preferable that the $T_{450\text{-}600AVE}$ be 94% or higher, even preferably 95% or higher.

The satisfaction of the spectroscopic characteristic (iv-2) means that the transparency in a red band is high and that the light blocking ability is high in a near-infrared wavelength of 750 to 900 nm. It is preferable that the VL50 be in a range of 685 to 750 nm, even preferably in a range of 690 to 750 nm.

The satisfaction of the spectroscopic characteristic (iv-3) means that the light blocking ability is high in the near-infrared wavelength of 750 to 900 nm. It is preferable that the $T_{750\text{-}900AVE}$ be 8.5% or lower, even preferably 7% or lower.

The satisfaction of the spectroscopic characteristic (iv-4) means that the light blocking ability is high in a near-infrared wavelength rang 750 to 900 nm and the transparency is high in a near-infrared wavelength of 930 to 950 nm. It is preferable that the $IR50_{850\text{-}950}$ be in a range of 905 to 930 nm, even preferably in a range of 910 to 930 nm.

The satisfaction of the spectroscopic characteristic (iv-5) means that the transparency is high in a near-infrared wavelength of 930 to 950 nm. It is preferable that the $T_{930\text{-}950AVE}$ be 81.5% or higher, even preferably 83% or higher.

The satisfaction of the spectroscopic characteristic (iv-6) means that the transparency is high in a near-infrared wavelength of 930 to 950 nm and the light blocking ability is high in a near-infrared wavelength of 1,080 nm or longer. It is preferable that the $IR50_{950\text{-}1100}$ be in a range of 1,005 to 1,080 nm, even preferably in a range of 1,010 to 1,075 nm.

In the present filter, it is preferable that at least one dielectric multilayer film be designed as a near-infrared light reflection layer (hereinafter also referred to as an "NIR reflection layer"). It is preferable that the other dielectric multilayer film be designed as an NIR reflection layer, a reflection layer having a reflection range other than a near-infrared range, or an anti-reflection layer.

The NIR reflection layer is a dielectric multilayer film that is designed so as to block near-infrared light. For example, the NIR reflection layer has such wavelength selectivity as to transmit visible light and near infrared light in a particular range and mainly reflect light in a blocking range of the resin film which is an absorption layer and light not in the particular near-infrared range. The reflection range of the NIR reflection layer may include a near-infrared light blocking range of the resin film. The NIR reflection layer may be designed as appropriate so as to have a specification that the NIR reflection layer has not only an NIR reflection property but also it blocks light in a wavelength range other than a near-infrared range, such as a near-ultraviolet range.

For example, the NIR reflection layer is constituted by a dielectric multilayer film that is formed by laying a low refractive index dielectric film (low refractive index film) and a high refractive index dielectric film (high refractive index film) alternately. It is preferable that the refractive index of the high refractive index film be 1.6 or higher, even preferably 2.2 to 2.5. Examples of materials of the high refractive index film include $Ta_2O_5$, $TiO_2$, and $Nb_2O_5$, among which $TiO_2$ is preferable from the viewpoints of the ease of film formation, the reproducibility of a refractive index etc., stability, etc.

On the other hand, it is preferable that the refractive index of the low refractive index film be lower than 1.6, even preferably 1.45 or higher and 1.55 or lower. Examples of materials of the low refractive index film include $SiO_2$ and $SiO_xN_y$. $SiO_2$ is preferable from the viewpoints of the reproducibility of film formation, stability, economic efficiency, etc.

To allow the NIR reflection layer to transmit visible light and particular near-infrared light, one option is to combine several kinds of dielectric multilayer films that are different from each other in spectroscopic characteristics in selecting desired transmission wavelength bands.

For example, adjustments can be made using the materials of the films and the thickness and the number of films of each layer.

From the viewpoints of the control of transmission and blocking wavelength bands, it is preferable that the total number of laminated films of the dielectric multilayer film constituting the NIR reflection layer be 50 or larger, even preferably 90 or larger and further preferably 130 or larger.

Furthermore, it is preferable that the total thickness of the reflection layer be 2 to 15 μm.

Incidentally, vacuum film forming processes such as a CVD method, a sputtering method, and a vacuum evaporation method and wet film forming processes such as a spray method and a dip method can be used for formation of the dielectric multilayer film.

The NIR reflection layer may provide prescribed optical characteristics by either a single layer (a group of dielectric multilayer films) or two layers. In the case where the NIR reflection layer includes two or more layers, they may be either the same or different in structure. In the case where the NIR reflection layer includes two or more layers, usually plural reflection layers having different reflection bands are employed as them. In the case where two reflection layers are provided, they may be such that one is a near-infrared reflection layer that blocks light in a shorter wavelength band of a near-infrared range and the other is a near-infrared/near-ultraviolet reflection layer that blocks both of light in a longer wavelength band of the near-infrared range and light in a near-ultraviolet range.

Examples of the anti-reflection layer include a dielectric multilayer film, an intermediate refractive index medium, and a moss eye structure in which the refractive index varies gradually. Among these examples, a dielectric multilayer film is preferable from the viewpoints of optical efficiency and productivity. The anti-reflection layer is formed by laying dielectric multilayer films alternately like the reflection layer is.

In the case where the present filter is used in, for example, an imaging apparatus such as a digital still camera, it can provide an imaging apparatus that is excellent in color reproducibility. An imaging apparatus including the present filter is equipped with a solid-state imaging device, an imaging lens, and the present filter. For example, the present filter can be used in such a manner as to be disposed between the imaging lens and the solid-state imaging device, or directly stuck to, for example, the solid-state imaging device or the imaging lens of the imaging apparatus via an adhesive layer.

EXAMPLES

Next, the invention will be described in more detail using Examples.

An ultraviolet/visible spectrophotometer (type "UH-4150" produced by Hitachi High-Tech Corporation) was used for measurement of various optical characteristics.

It is noted that values of spectroscopic characteristics for which no particular incident angle is specified are values measured at an incident angle of 0° (i.e., from a direction that is perpendicular to a major surface of an optical filter).

Dyes used in each Example are as follows:

Compound 1 (squarylium dye): synthesized on the basis of U.S. Pat. No. 5,543,086B;

Compound 2 (squarylium dye): synthesized on the basis of U.S. Pat. No. 5,543,086B;

Compound 3 (squarylium dye): synthesized on the basis of US2014/0061505 and WO2014/088063;

Compound 4 (cyanine dye): synthesized as described in Synthesis example 1 (described later);

Compound 5 (squarylium dye): synthesized on the basis of WO2017/135359;

Compound 6: (cyanine dye) synthesized as described in Synthesis example 2 (described later);

Compounds 7, 8, and 9 (cyanine dyes): synthesized on the basis of "Dyes and Pigments, 73 (2007), pp. 344-352";

Compound 10: synthesized on the basis of JP4081149B;

Compound 11: synthesized on the basis of WO2020/129909; and

Compound 12: synthesized on the basis of JP2014-25016A.

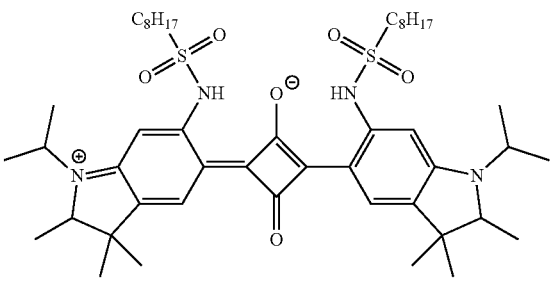

Compound 1

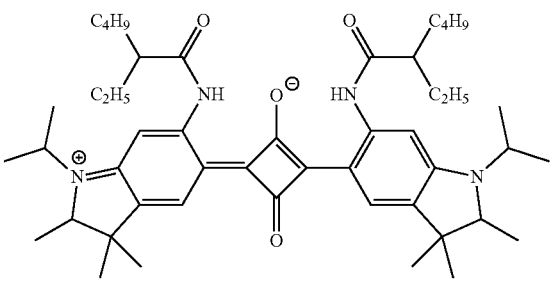

Compound 2

Compound 3
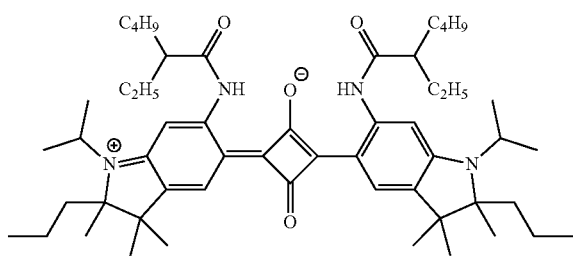
Compound 4
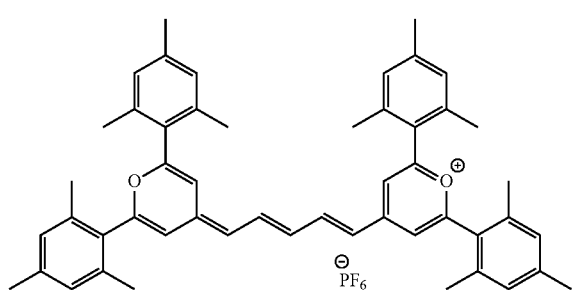
Compound 5
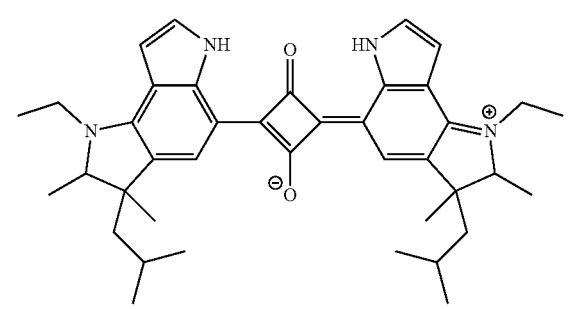
Compound 6
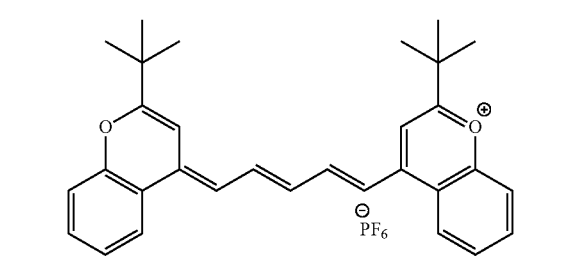
Compound 7
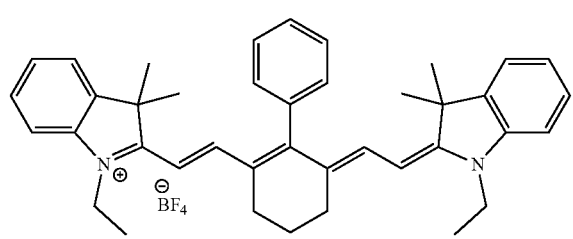
Compound 8
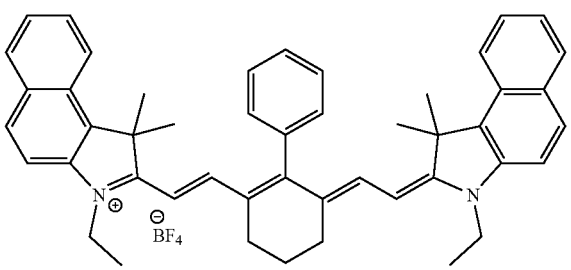
Compound 9
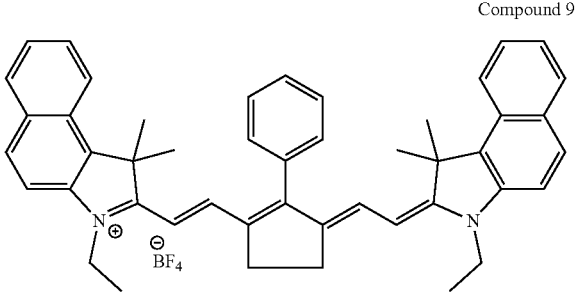
Compound 10
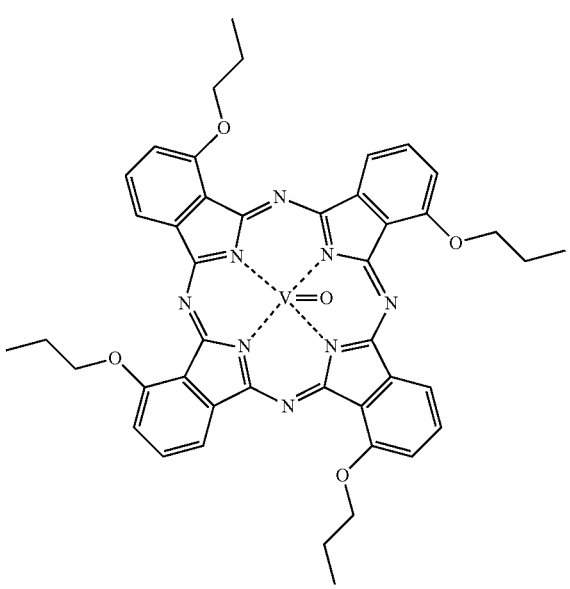
Compound 11
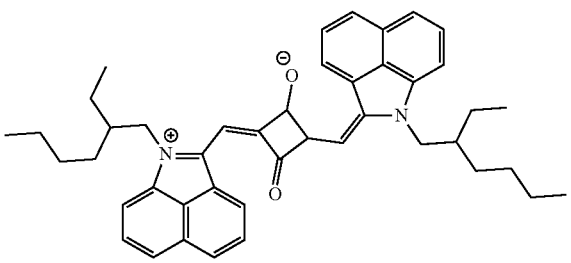

Compound 12

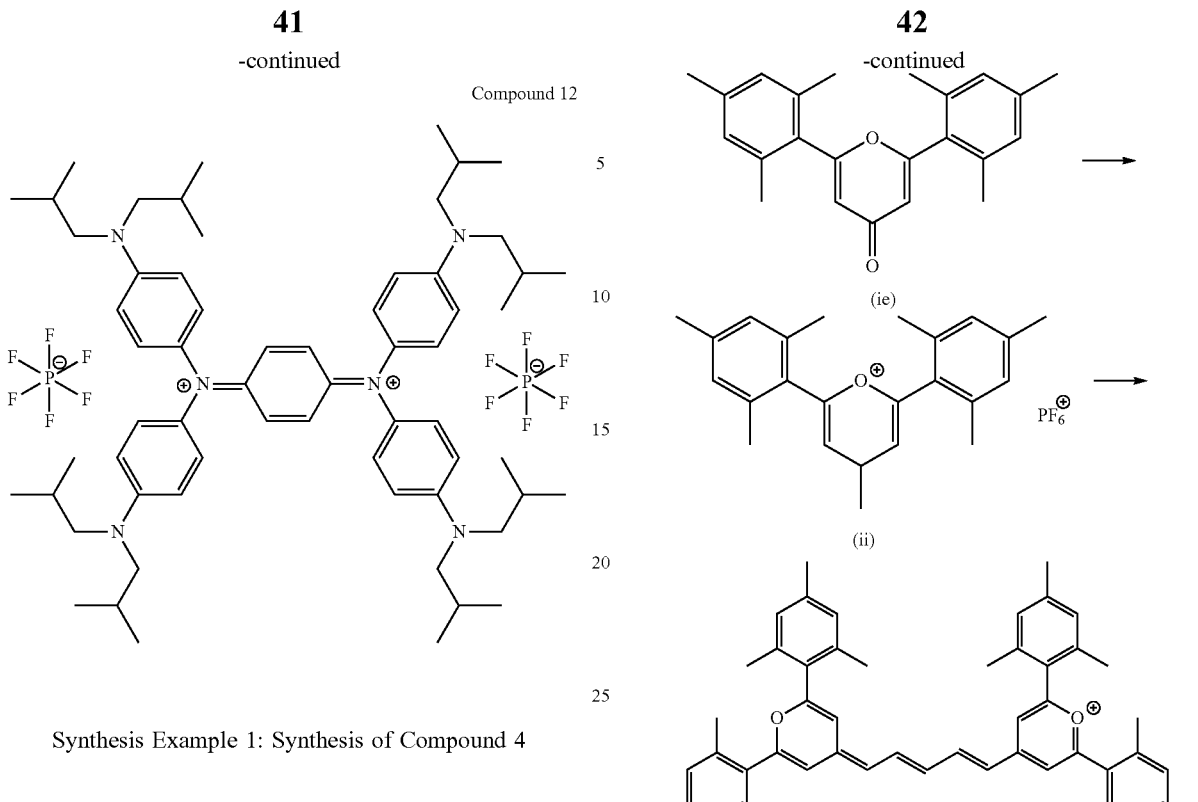

Synthesis Example 1: Synthesis of Compound 4

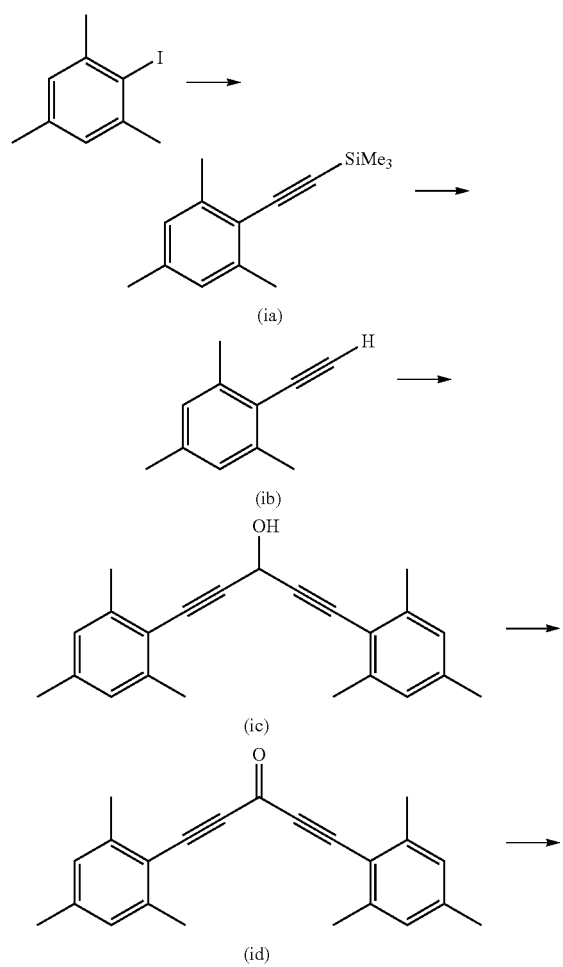

<Step 1>

Mesityl iodide (100 g, 406.4 mmol), trimethylsilylacetylene (59.9 g, 609.5 mmol), tetrakis(triphenylphosphine) palladium (O) (6.1 g, 5.28 mmol), copper iodide (2.0 g, 10.6 mmol), and diethylamine (500 mL) were put into an eggplant flask of 1,000 mL. After the inside of the flask was deaired, nitrogen replacement was made and then heating and stirring were performed at 50° C. for 6 hours. After the end of reaction, the solvent was distilled away under reduced pressure, water was added, and extraction was made using dichloromethane. The dichloromethane was distilled away under reduced pressure and refinement was performed by flash column chromatography (hexane), whereby an intermediate ia (90.1 g (quant.)) was obtained.

<Step 2>

The intermediate ia (90.1 g, 416.4 mmol) and methanol (600 mL) were put into an eggplant flask of 1 L and stored in ice. Potassium carbonate (167.9 g, 1,214.8 mmol) was added to it and a resulting solution was stirred under a nitrogen flow at room temperature for 1 hour. After the end of reaction, potassium carbonate was removed from the reaction system by subjecting a reaction solution to celite filtration and a resulting filtrate was subjected to distillation under reduced pressure. Water was added to a resulting orange-yellow liquid and extraction was made using dichloromethane. After the dichloromethane was distilled away under reduced pressure, refinement was performed by flash column chromatography (hexane), whereby an intermediate ib (58.5 g (quant.)) was obtained.

<Step 3>

The intermediate (ib) (22.0 g, 152.6 mmol) and tetrahydrofuran (125 mL) were put into an eggplant flask of 1,000 mL and stirred under a nitrogen flow at −78° C. After addition of n-butyllithium (1.6 mol/L in hexane, 100 mL) using a dropping funnel, stirring was performed at −78° C. for 1 hour. Subsequently, ethyl formate (5.7 g, 76.3 mmol) dissolved in tetrahydrofuran (20 mL) was added using a dropping funnel and a resulting solution was stirred at −78° C. for 5 hours and at 0° C. for 1.5 hours. After the end of reaction, the reaction was stopped by adding water and extraction was made using dichloromethane. The dichloromethane was distilled away under reduced pressure and a resulting ocher solid was cleaned by hexane, whereby an intermediate ic (13.4 g, (56%)) was obtained.

<Step 4>

The intermediate ic (25.9 g, 83.7 mmol), dichloromethane (500 mL), and manganese oxide (36.4 g, 418.7 mmol) were put into an eggplant flask of 1,000 mL and stirred under a nitrogen flow at room temperature for 1 hour. After the end of reaction, manganese oxide was removed by filtering a reaction solution and a filtrate was subjected to distillation under reduced pressure. A yellow powder obtained was cleaned by hexane, whereby an intermediate id (23.6 g (92%)) was obtained.

<Step 5>

The intermediate id (21.9 g, 69.7 mmol), p-toluenesulfonic acid-hydrate (2.4 g, 13.9 mmol), methanol (230 mL), and toluene (230 mL) were put into an eggplant flask of 1,000 mL and stirred at 110° C. for 8 hours. Subsequently, the solvent was distilled away under reduced pressure, methanol (280 mL) and concentrated hydrochloric acid (70 mL) were added to a resulting substance, and stirring was performed at 70° C. for one night. After the end of reaction, the reaction was stopped by storing a reaction solution in ice and then adding water to it and extraction was made using dichloromethane. The dichloromethane was distilled away under reduced pressure, toluene (350 mL) and trifluoromethanesulfonic acid (21.0 g, 139.9 mmol) were added, and a resulting solution was stirred at 100° C. for 2.5 hours. After the end of reaction, the reaction was stopped by storing a reaction solution in ice and then adding water to it and a toluene layer was extracted. After the toluene was distilled away under reduced pressure, refinement was performed by flash column chromatography (hexane/dichloromethane), whereby a pink powder was obtained. The pink powder obtained was cleaned by hexane, whereby an intermediate ie (15.5 g (67%)) was obtained.

<Step 6>

The intermediate ie (6.0 g, 18.0 mmol) and tetrahydrofuran (75 mL) were put into an eggplant flask of 500 mL and stirred at 0° C. Methylmagnesium bromide (13% tetrahydrofuran solution, 49.7 g, 54.1 mmol) was added to a resulting solution and heating and stirring were performed under a nitrogen flow at 70° C. for 1 hour. After the end of reaction, the reaction was stopped by pouring a reaction solution into a 10% aqueous solution (350 mL) of 0° C. of hexafluoro phosphoric acid little by little and stirring a resulting solution at 0° C. for 10 minutes. The solution was subjected to extraction using dichloromethane, a dichloromethane layer was cleaned by water, and the dichloromethane was distilled away under reduced pressure. An intermediate if (8.2 g (95%)) was obtained by cleaning a resulting yellow powder by hexane.

<Step 7>

The intermediate if (1.75 g, 3.7 mmol), malonaldehyde dianilide hydrochloride (0.47 g, 1.84 mmol), sodium acetate (0.72 g, 8.82 mmol), acetic acid (15 mL), and acetic acid anhydride (15 mL) were put into an eggplant flask of 200 mL and heated and stirred in a nitrogen flow at 80° C. for 45 minutes. After the end of reaction, a reaction solution was stored in ice and water was added. Then a reaction solution was filtered to collect a dark green powder. The collected powder was refined by flash column chromatography (dichloromethane/ethyl acetate) and a solid obtained was cleaned by a solvent that consists of hexane and ethyl acetate (1:1), whereby Compound 4 (1.4 g (88%)) was obtained.

Synthesis Example 2: Synthesis of Compound 6

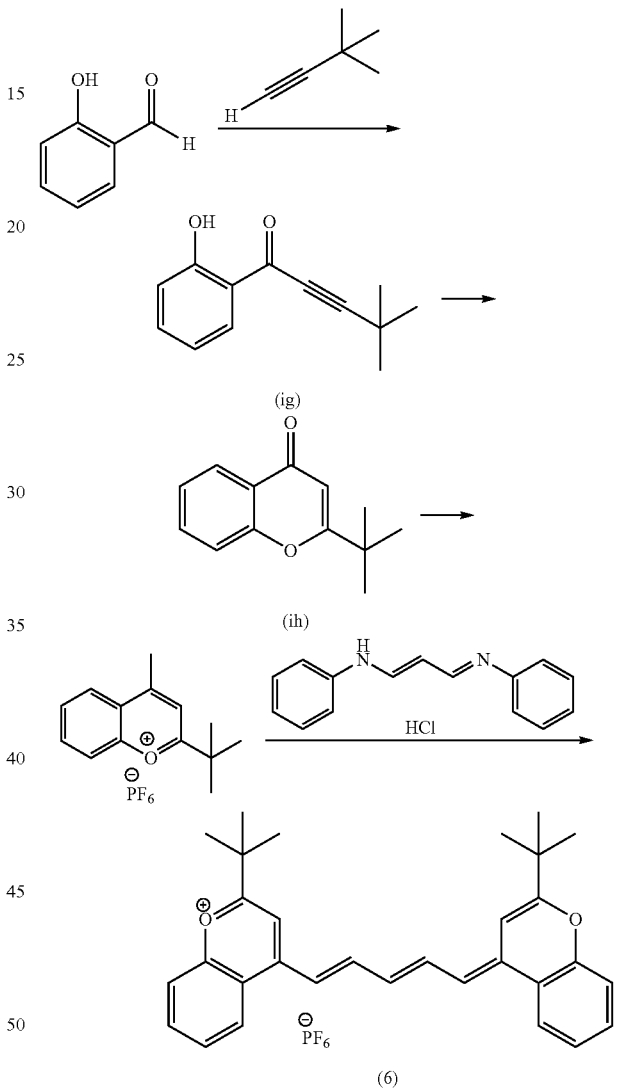

<Step 1>

First, 3, 3-dimethyl-1-butyne (13 g, 160 mmol) and tetrahydrofuran (40 mL) were put into an eggplant flask of 1 L, a resulting solution was cooled to −78° C. and stirred, n-butyl lithium (1.6 M in n-hexane, 100 mL) was dropped onto it, and stirring was performed at −78° C. for 1 hour. Then salicylaldehyde (10 g, 82 mmol) dissolved in tetrahydrofuran (80 mL) was added and a resulting solution was stirred at room temperature for 3 hours. After the end of reaction, quenching was made by adding an aqueous solution of saturated ammonium chloride and extraction was made by ethyl acetate. After the solvent was removed, manganese dioxide (35 g, 400 mmol) and acetone (80 mL)

were added and stirring was performed at room temperature for 16 hours. After the end of reaction, filtering was performed. After the solvent of a filtrate was removed, refinement was performed by column chromatography, whereby an intermediate ig (6.1 g (37%)) was obtained.

<Step 2>

The intermediate ig (6.1 g mmol, 30 mmol) and N,N-dimethylformamide (120 mL) were put into an eggplant flask of 500 mL and then cooled to 0° C. and stirred. Then 4-dimethylaminopyridine (0.37 g, 3.0 mmol) was added and reaction was caused at room temperature for 16 hours. After the end of the reaction, quenching was made by adding water and extraction was made by ethyl acetate. After the solvent was removed, refinement was performed by column chromatography, whereby an intermediate ih (4.2 g (70%)) was obtained.

<Step 3>

The intermediate ih (5.0 g, 25 mmol) was put and tetrahydrofuran (60 mL) was then put into an eggplant flask of 500 mL, a resulting solution was cooled to 0° C. and stirred, methylmagnesium bromide (1 M in tetrahydrofuran, 37 mL) was dropped onto it, and reaction was caused at room temperature for 5 hours. After the end of the reaction, quenching was made by adding ice water, an aqueous solution of 60% hexafluorophosphate (150 mL) was added, and stirring was performed at room temperature for 30 minutes. Extraction was made by dichloromethane. After the solvent was removed, a precipitated solid was cleaned by ethyl acetate, whereby an intermediate ii (7.2 g (84%)) was obtained.

<Step 4>

The intermediate ii (5.2 g, 15 mmol), malonaldehyde dianilide hydrochloride (1.9 g, 7.5 mmol), sodium acetate (3.0 g, 36 mmol), acetic acid (60 mL), and acetic acid anhydride (60 mL) were put into an eggplant flask of 500 mL and stirred at 80° C. for 2 hours. After the end of reaction, water was added. A precipitated solid was collected by filtering and refinement was performed by column chromatography, whereby Compound 6 (1.8 g (41%)) was obtained.

<Spectroscopic Characteristics of IR Dye>

A polyimide resin ("C-3G30G" produced by Mitsubishi Gas Chemical Company, Inc.) was dissolved in an organic solvent (cyclohexane and γ-butyrolactone (mass ratio:1:1)) at a concentration of 8.5 mass %.

Each of the dye compounds was added to the thus-prepared polyimide resin solution so as to obtain a concentration of 6 parts by mass with respect to the resin of 100 parts by mass and stirring was performed for 2 hours while heating was made to 50° C. A dye-containing resin solution was applied to a glass substrate (alkali glass "D263" produced by Schott AG) and dried, whereby a 1 μm-thick resin film (coated film) was obtained.

A spectral internal transmittance curve was calculated using a spectral transmittance curve and a spectral reflectance curve of this glass plate with a resin film and normalized so that the transmittance at a maximum absorption wavelength became 10%.

Spectroscopic characteristics are shown in the following table.

TABLE 10

| Compound | Maximum absorption wavelength (nm) (in dichloromethane) | Maximum absorption wavelength D (nm) (in polyimide resin) | Average transmittance 103.5 − (D/100) | E (%) in 450-600 nm | Absolute value (nm) of difference between IR20 and IR80 |
|---|---|---|---|---|---|
| 1 | 698 | 707 | 96.43 | 98.3 | — |
| 2 | 706 | 717 | 96.33 | 98.4 | — |
| 3 | 712 | 722 | 96.28 | 98.8 | — |
| 4 | 738 | 741 | 96.09 | 98.1 | — |
| 5 | 742 | 753 | 95.97 | 98.6 | — |
| 6 | 769 | 774 | 95.76 | 97.5 | — |
| 7 | 764 | 773 | 95.77 | 97.4 | — |
| 8 | 801 | 811 | 95.39 | 96.5 | — |
| 9 | 833 | 845 | 95.05 | 95.7 | 42.6 |
| 10 | 716 | 716 | 96.34 | 72.0 | — |
| 11 | 883 | 902 | 94.48 | 91.8 | 51.8 |
| 12 | 1,102 | 1,103 | 92.47 | 87.5 | — |

Examples 1-1 to 1-6: Spectroscopic Characteristics of Resin Film

A polyimide resin ("C-3G30G" produced by Mitsubishi Gas Chemical Company, Inc.) was dissolved in an organic solvent (cyclohexane and γ-butyrolactone (mass ratio: 1:1)) at a concentration of 8.5 mass %.

Each of the compounds was added to the thus-prepared polyimide resin solution so as to obtain contents (parts by mass) shown in the following table with respect to the resin of 100 parts by mass and stirring was performed for 2 hours while heating was made to 50° C. A dye-containing resin solution was applied to a glass substrate (alkali glass "D263" produced by Schott AG) and dried, whereby a 3 μm-thick resin film (coated film) was obtained.

Spectroscopic characteristics are shown in the following table.

It is noted that Examples 1-1 to 1-6 are Referential Examples.

TABLE 11

|  |  | Example 1-1 | Example 1-2 | Example 1-3 | Example 1-4 | Example 1-5 | Example 1-6 |
|---|---|---|---|---|---|---|---|
| Compound (A) | Compound 1 | — | 1.25 | 0.5 | 2.5 | 1.75 | — |
|  | Compound 2 | 1.25 | — | — | — | — | 1.25 |
|  | Compound 3 | — | — | 1.25 | — | — | — |
| Compound (B) | Compound 4 | — | 0.75 | — | — | — | — |
|  | Compound 5 | 1.25 | — | — | — | — | — |
|  | Compound 6 | — | 0.75 | — | — | 1.75 | — |
|  | Compound 7 | — | — | 1.25 | — | — | — |
|  | Compound 8 | 1.5 | 1.5 | 1.5 | — | — | 7 |
| Compound (C) | Compound 9 | 1.75 | 1.75 | 1.75 | — | — | — |
| Spectroscopic characteristics of resin film | Average internal transmittance $T_{450\text{-}600AVE}$ (%) | 88.3 | 88.0 | 87.3 | 96.6 | 93.4 | 81.9 |
|  | Wavelength IR50 (nm) at which internal transmittance is 50% | 644.4 | 634.4 | 647.6 | 646.2 | 629.8 | 629.7 |
|  | Average internal transmittance $T_{700\text{-}830AVE}$ (%) | 1.3 | 1.5 | 1.0 | 72.2 | 20.6 | 0.3 |
|  | Maximum internal transmittance $T_{720\text{-}830MAX}$ (%) | 6.2 | 6.0 | 6.1 | 100.6 | 88.5 | 7.0 |
|  | Absolute value (nm) of difference between IR20 and IR80 in 850-950 nm | 39.2 | 39.4 | 39.4 | — | — | 33.2 |

In each of Examples 1-1 to 1-3, the absorption band in the near-infrared range was wide and the visible light transmittance was high.

In Example 1-4, the absorption band in the near-infrared range was narrow.

In Example 1-5, the absorption band in the near-infrared range was a little narrow.

In Example 1-6, the absorption band in the near-infrared range was wide but the visible light transmittance was low. This is explained as follows: absorption occurred also in the visible range as a result of widening of the absorption band by increasing the addition amount of the compound (B).

Example 2-1: Spectroscopic Characteristics of Dielectric Multilayer Film

A reflection layer was designed that consisted of a dielectric multilayer film 1 having 69 layers and a dielectric multilayer film 2 having 76 layers in each of which $TiO_2$ films and $SiO_2$ films were laid alternately.

Spectroscopic characteristics of the combination of the dielectric multilayer film 1 and the dielectric multilayer film 2 are shown in the following table.

Figure 5:
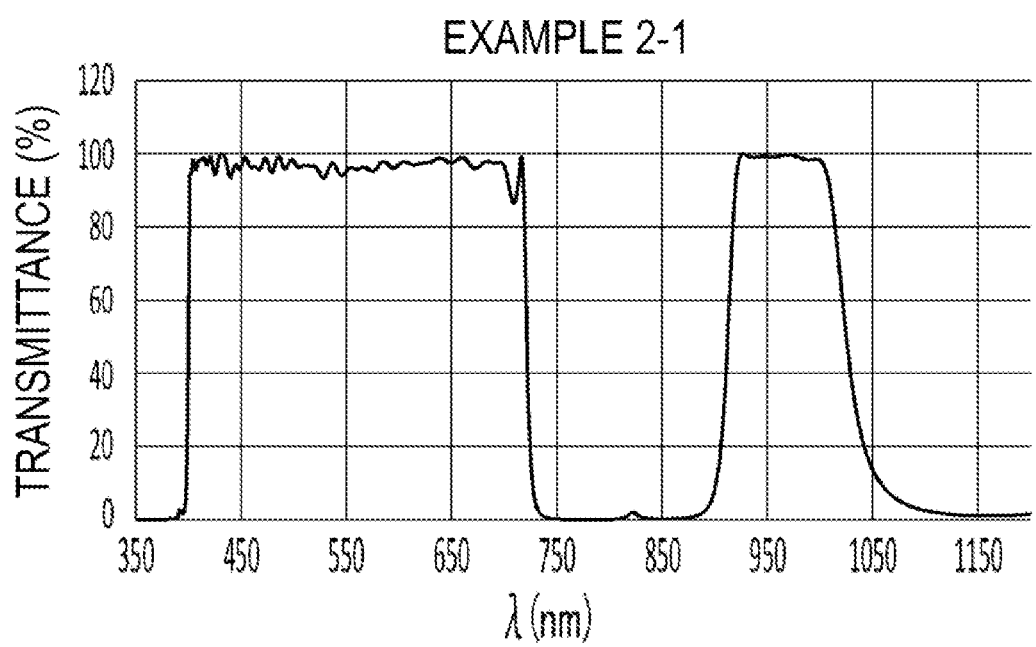
FIG. 5 is a graph showing a spectral transmittance curve of a dielectric multilayer film of Example 2-1.

A spectral transmittance curve of the combination of the dielectric multilayer film 1 and the dielectric multilayer film 2 is shown in FIG. 5.

It is noted that Example 2-1 is a Referential Example.

TABLE 12

|  |  | Example 2-1 |
|---|---|---|
| Spectroscopic characteristics of dielectric multilayer film | Average transmittance $T_{450\text{-}600AVE}$ (%) in 450-600 nm | 96.4 |
|  | Wavelength $IR50_{600\text{-}800}$ (nm) at which transmittance is 50% in 600-800 nm | 721.9 |
|  | Average transmittance $T_{750\text{-}900AVE}$ (%) in 750-900 nm | 0.73 |
|  | Wavelength $IR50_{850\text{-}900}$ (nm) at which transmittance is 50% in 850-950 nm | 912.3 |
|  | Average transmittance $T_{930\text{-}950AVE}$ (%) in 930-950 nm | 99.2 |
|  | Wavelength $IR50_{950\text{-}1100}$ (nm) at which transmittance is 50% in 950-1,100 nm | 1025.5 |

Example 3-1: Spectroscopic Characteristics of Optical Filter

An optical filter was obtained by laying the dielectric multilayer film 2 produced in Example 2-1, a glass substrate (alkali glass "D263" produced by Schott AG), the resin film of Example 1-1, and the dielectric multilayer film 1 produced in Example 2-1 in this order.

Examples 3-2 to 3-5: Spectroscopic Characteristics of Optical Filter

Optical filters were obtained in the same manner as in Example 3-1 except that the resin films shown in the following table were employed.

Spectroscopic characteristics are shown in the following table.

Figure 6:
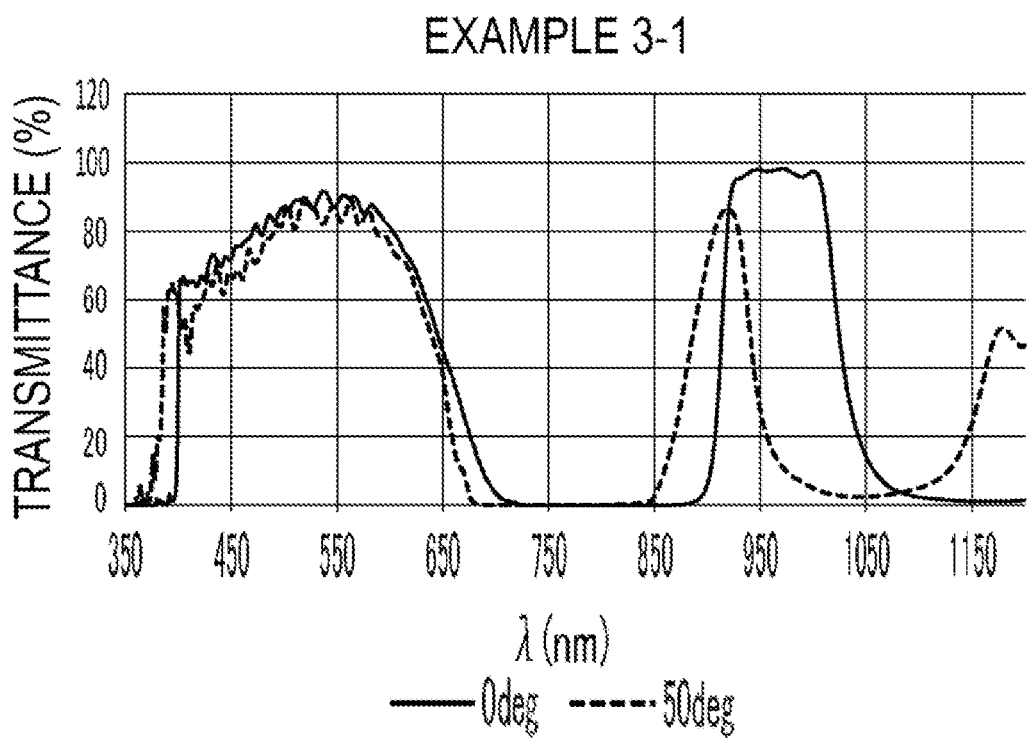
FIG. 6 is a graph showing a spectral transmittance curve of an optical filter of Example 3-1.

A spectral transmittance curve of the optical filter of Example 3-1 is shown in FIG. 6 and a spectral transmittance curve of the optical filter of Example 3-4 is shown in FIG. 7.

It is noted that Examples 3-1 to 3-3 are Inventive Examples and Examples 3-4 and 3-5 are Comparative Examples.

TABLE 13

| | | Example 3-1 | Example 3-2 | Example 3-3 | Example 3-4 | Example 3-5 |
|---|---|---|---|---|---|---|
| Resin film | | Example 1-1 | Example 1-2 | Example 1-3 | Example 1-4 | Example 1-5 |
| Spectroscopic characteristics of optical filter | Maximum transmittance $T_{700-900(0deg)MAX}$ (%) at 0 deg. in 700-900 nm | 5.8 | 5.8 | 5.8 | 7.9 | 7.7 |
| | Maximum transmittance $T_{700-850(50deg)MAX}$ (%) at 50 deg. in 700-850 nm | 2.7 | 2.6 | 2.6 | 53.6 | 47.0 |
| | $IR70_{900-950(0deg)} - IR10_{900-950(0deg)}$ (nm) at 0 deg. in 900-950 nm | 12.4 | 14.2 | 12.3 | 13.8 | 13.8 |
| | $IR70_{850-930(50deg)} - IR10_{850-930(50deg)}$ (nm) at 50 deg. in 850-930 nm | 40.2 | 39.9 | 40.3 | — | — |
| | Absolute value (nm) of difference between $IR50_{850(0deg)}$ and $IR50_{850(50deg)}$ | 27.0 | 25.3 | 27.0 | 63.2 | 60.5 |
| | Average transmittance $T_{450-600(0deg)AVE}$ (%) at 0 deg. in 450-600 nm | 85.3 | 85.0 | 84.4 | 92.9 | 90.0 |
| | Average transmittance $T_{930-950(0deg)AVE}$ (%) at 0 deg. in 930-950 nm | 96.9 | 95.5 | 96.6 | 99.0 | 98.4 |

Each of the optical filters of Examples 3-1 to 3-3 were high in the transmittance in the visible range and the near-infrared range around 950 nm, the light blocking ability in the wavelength of 700 to 900 nm, the steepness around 900 nm, and the oblique incidence characteristic around 900 nm and thus exhibited superior optical characteristics.

Although each of the optical filters of Examples 3-4 and 3-5 was high in the transmittance in the visible range and the near-infrared range around 950 nm, each of them was low in the light blocking ability in the wavelength of 700 to 900 nm, the steepness around 900 nm, and the oblique incidence characteristic around 900 nm.

Although the invention has been described in detail with reference to the particular embodiment, it is apparent to those skilled in the art that various changes and modifications can be made without departing from the spirit and scope of the invention. The present application is based on Japanese Patent Application No. 2020-171326 filed on Oct. 9, 2020, the disclosure of which is incorporated herein by reference.

INDUSTRIAL APPLICABILITY

The optical filter according to the invention is high in the transparency for visible light and particular near-infrared light, can block the other near-infrared light, and exhibits a good near-infrared light blocking property in which the reduction of near-infrared light blocking ability at large incident angles is suppressed. The optical filter according to the invention is useful when used in, for example, information acquisition devices such as cameras and sensors for transport machines that have been being increased in performance in recent years.

DESCRIPTION OF SYMBOLS 1A, 1B, 1C, 1D . . . Optical filter; 10 . . . Substrate; 11 . . . Support body; 12 . . . Resin film; 30 . . . Dielectric multilayer film.

What is claimed is:

1. An optical filter comprising:
a substrate; and
a dielectric multilayer film laid on or above at least one major surface of the substrate as an outermost layer, wherein
the substrate comprises a resin film comprising a dye (I) having a maximum absorption wavelength in a wavelength of 690 to 900 nm in dichloromethane, and a resin,
the optical filter transmits visible light and light in at least part of a wavelength of 900 to 1,000 nm, and
the optical filter satisfies all of the following spectroscopic characteristics (i-1) to (i-6):
(i-1) a maximum transmittance $T_{700\text{-}900(0deg)MAX}$ in a spectral transmittance curve in a wavelength of 700 to 900 nm at an incident angle of 0° is 7% or lower;
(i-2) a maximum transmittance $T_{700\text{-}850(50deg)MAX}$ in a spectral transmittance curve in a wavelength of 700 to 850 nm at an incident angle of 50° is 5% or lower;
(i-3) $IR70_{900\text{-}950(0deg)}$–$IR10_{900\text{-}950(0deg)}$ is 20 nm or smaller, where the $IR10_{900\text{-}950(0deg)}$ and the $IR70_{900\text{-}950(0deg)}$ are shortest wavelengths at which transmittances are 10% and 70%, respectively, in a spectral transmittance curve in a wavelength of 900 to 950 nm at an incident angle of 0°;
(i-4) $IR70_{850\text{-}930(50deg)}$–$IR10_{850\text{-}930(50deg)}$ is 50 nm or smaller, where the $IR10_{850\text{-}930(50deg)}$ and the $IR70_{850\text{-}930(50deg)}$ are shortest wavelengths at which transmittances are 10% and 70%, respectively, in a spectral transmittance curve in a wavelength of 850 to 930 nm at an incident angle of 50°;
(i-5) an absolute value of a difference between $IR50_{850(0deg)}$ and $IR50_{850(50deg)}$ is 30 nm or smaller, where the $IR50_{850(0deg)}$ and the $IR50_{850(50deg)}$ are shortest wavelengths at which transmittances are 50% in a spectral transmittance curve in a wavelength of 850 nm or longer at incident angles of 0° and 50°, respectively; and
(i-6) an average transmittance $T_{450\text{-}600(0deg)AVE}$ in a spectral transmittance curve in a wavelength of 450 to 600 nm at an incident angle of 0° is 60% or higher.

2. The optical filter according to claim 1, further satisfying the following spectroscopic characteristic (i-7):
(i-7) an average transmittance $T_{930\text{-}950(0deg)AVE}$ in a spectral transmittance curve in a wavelength of 930 to 950 nm at an incident angle of 0° is 70% or higher.

3. The optical filter according to claim 1, wherein the average transmittance $T_{450\text{-}600(0deg)AVE}$ in the spectroscopic characteristic (i-6) is 75% or higher.

4. The optical filter according to claim 1, wherein the resin film satisfies all of the following spectroscopic characteristics (ii-1) to (ii-5):
(ii-1) an average internal transmittance $T_{450\text{-}600AVE}$ in a spectral transmittance curve in a wavelength of 450 to 600 nm is 80% or higher;
(ii-2) a wavelength IR50 at which an internal transmittance is 50% is in a wavelength of 620 to 660 nm;
(ii-3) an average internal transmittance $T_{700\text{-}830AVE}$ in a spectral transmittance curve in a wavelength of 700 to 830 nm is 5% or lower;
(ii-4) a maximum internal transmittance $T_{720\text{-}830MAX}$ in a spectral transmittance curve in a wavelength of 720 to 830 nm is 10% or lower; and
(ii-5) an absolute value of a difference between IR20 and IR80 is 50 nm or smaller, where the IR20 and the IR80 are shortest wavelengths at which internal transmittances are 20% and 80%, respectively, in a wavelength of 850 to 950 nm.

5. The optical filter according to claim 1, wherein the dye (I) satisfies the following spectroscopic characteristic (iii-1) in a spectral internal transmittance curve measured by dissolving the dye (I) in the resin so that an internal transmittance at a maximum absorption wavelength in the resin included in the resin film becomes 10%:
(iii-1) E>103.5−(D/100), where the D (nm) is the maximum absorption wavelength and the E is an average interval transmittance in a wavelength of 450 to 600 nm.

6. The optical filter according to claim 5, wherein each of the compounds (A), (B), and (C) is selected from squarylium compounds or cyanine compounds.

7. The optical filter according to claim 1, wherein the dye (I) comprises:
one or more compounds (A) each having a maximum absorption wavelength in a wavelength of 690 nm or longer and shorter than 735 nm in dichloromethane;
one or more compounds (B) each having a maximum absorption wavelength in a wavelength of 735 nm or longer and shorter than 830 nm in dichloromethane; and
one or more compounds (C) each having a maximum absorption wavelength in a wavelength of 830 nm or longer and shorter than 900 nm in dichloromethane.

8. The optical filter according to claim 7, wherein the compounds (C) satisfies the following characteristic (iii-2) in a spectral internal transmittance curve measured by dissolving the compound (C) in the resin included in the resin film so that an internal transmittance at a maximum absorption wavelength becomes 10%:
(iii-2) an absolute value of a difference between IR20 and IR80 is 50 nm or smaller, where the IR20 and the IR80 are wavelengths at which internal transmittances are 20% and 80%, respectively, in a wavelength longer than the maximum absorption wavelength.

9. The optical filter according to claim 1, wherein the dielectric multilayer film satisfies all of the following spectroscopic characteristics (iv-1) to (iv-6) in a spectral transmittance curve at an incident angle of 0°:
(iv-1) an average transmittance $T_{450\text{-}600AVE}$ in a wavelength of 450 to 600 nm is 93% or higher;

(iv-2) in a wavelength of 600 to 800 nm, a wavelength VL50 at which a transmittance is 50% is in a wavelength of 680 to 750 nm;

(iv-3) an average transmittance $T_{750\text{-}900AVE}$ in a wavelength of 750 to 900 nm is 10% or lower;

(iv-4) in a wavelength of 850 to 950 nm, a wavelength $IR50_{850\text{-}950}$ at which a transmittance is 50% is in a wavelength of 900 to 930 nm;

(iv-5) an average transmittance $T_{930\text{-}950AVE}$ in a wavelength of 930 to 950 nm is 80% or higher; and (iv-6) in a wavelength of 950 to 1,100 nm, a wavelength $IR50_{950\text{-}1100}$ at which a transmittance is 50% is in a wavelength of 1,000 to 1,080 nm.

10. The optical filter according to claim 1, wherein the substrate comprises a support body and the resin film, and the resin film is laid on at least one major surface of the support body.

11. The optical filter according to claim 1, wherein the resin is a polyimide resin.

* * * * *